United States Patent
Kawai et al.

(10) Patent No.: US 10,992,240 B2
(45) Date of Patent: Apr. 27, 2021

(54) POWER CONVERSION DEVICE

(71) Applicants: Mitsubishi Electric Corporation, Chiyoda-ku (JP); National University Corporation Nagaoka University of Technology, Nagaoka (JP)

(72) Inventors: Yu Kawai, Chiyoda-ku (JP); Tatsuya Okuda, Chiyoda-ku (JP); Jun-ichi Itoh, Nagaoka (JP); Hoai Nam Le, Nagaoka (JP)

(73) Assignees: Mitsubishi Electric Corporation, Chiyoda-ku (JP); National University Corporation Nagaoka University of Technology, Nagaoka (JP)

( * ) Notice: Subject to any disclaimer, the term of this patent is extended or adjusted under 35 U.S.C. 154(b) by 0 days.

(21) Appl. No.: 16/650,059

(22) PCT Filed: Sep. 20, 2018

(86) PCT No.: PCT/JP2018/034744
§ 371 (c)(1),
(2) Date: Mar. 24, 2020

(87) PCT Pub. No.: WO2019/097835
PCT Pub. Date: May 23, 2019

(65) Prior Publication Data
US 2020/0295674 A1 Sep. 17, 2020

(30) Foreign Application Priority Data
Nov. 14, 2017 (JP) .............................. JP2017-218967

(51) Int. Cl.
*H02M 7/5387* (2007.01)
*H02M 1/08* (2006.01)
*H02M 1/00* (2006.01)

(52) U.S. Cl.
CPC ....... *H02M 7/53871* (2013.01); *H02M 1/083* (2013.01); *H02M 2001/0058* (2013.01)

(58) Field of Classification Search
CPC ........... H02M 7/5387; H02M 7/53871; H02M 7/53873; H02M 1/08; H02M 1/083; H02M 2001/0054; H02M 2001/0058
See application file for complete search history.

(56) References Cited

U.S. PATENT DOCUMENTS

2018/0115162 A1* 4/2018 Ichiki .................... H02M 5/458
2018/0138827 A1* 5/2018 Goto ..................... H02M 7/521
(Continued)

FOREIGN PATENT DOCUMENTS

| JP | 2014-64363 A | 4/2014 |
|---|---|---|
| WO | WO 2012/153368 A1 | 11/2012 |
| WO | WO 2019/026141 A1 | 2/2019 |

OTHER PUBLICATIONS

International Search Report dated Nov. 13, 2018 in PCT/JP2018/034744 filed Sep. 20, 2018, 1 page.

*Primary Examiner* — Adolf D Berhane
(74) *Attorney, Agent, or Firm* — Oblon, McClelland, Maier & Neustadt, L.L.P.

(57) ABSTRACT

A power conversion device which reduces switching losses and stabilizes the output power. A switching-mode changer generates a reference signal for switching a mode of operation of the full-bridge circuit to a first switching mode or a second switching mode. In the first switching mode, an upper arm and a lower arm are switched synchronously, and a lower arm and an upper arm are non-conducting. In the second switching mode, the lower arm and the upper arm are switched synchronously, and the upper arm and the lower arm are non-conducting. The switching-mode changer adjusts the phase of the reference signal so that the reactive power is reduced.

7 Claims, 22 Drawing Sheets

(56) References Cited

U.S. PATENT DOCUMENTS

| | | | |
|---|---|---|---|
| 2018/0166979 A1* | 6/2018 | Shimizu | H02M 3/156 |
| 2020/0059103 A1* | 2/2020 | Izumi | H02J 3/32 |
| 2020/0403516 A1* | 12/2020 | Kawamura | H02M 3/33569 |
| 2021/0013796 A1* | 1/2021 | Amimoto | H02M 7/537 |

* cited by examiner

POWER CONVERSION DEVICE

TECHNICAL FIELD

The present disclosure relates to a power conversion device that converts a direct-current (DC) voltage from a DC power supply into an alternating-current (AC) voltage.

BACKGROUND ART

Conventionally, inverters are known which convert DC voltage generated from an energy source, such as the sunlight, into AC voltage. The inverters are, in general, configured of a bridge circuit having multiple legs each consisting of an upper arm and a lower arm. In such a bridge circuit, the waveform of output AC current is disturbed near a zero crossing, at which output AC current alternates in polarity between positive and negative, due to the timing misalignment between switching of the arms and the zero crossing timing. This may cause the output power rendered unstable. In order to inhibit the current waveform disturbance near the zero crossing, Japanese Patent Laying-Open No. 2014-64363 (PTL 1) discloses an inverter which causes the upper arm and the lower arm of each leg to alternately turn on and off in a period that contains a zero crossing.

CITATION LIST

Patent Literature

PTL 1: Japanese Patent Laying-Open No. 2014-64363

SUMMARY OF INVENTION

Technical Problem

However, with the inverter disclosed in Japanese Patent Laying-Open No. 2014-64363, all the arms switch during the period that contains a zero crossing, and thus an increased switching losses result.

The present disclosure is made to solve the above problem, and an object of the present disclosure is to provide a power conversion device that achieves reduction in switching losses and stabilizes the output power.

Solution to Problem

A power conversion device according to a certain aspect of the present disclosure converts a DC voltage from a DC power supply into an AC voltage. The power conversion device includes a first terminal, a second terminal, a third terminal, and a fourth terminal, a full-bridge circuit, a reactor, a switching-mode changer, and a PWM controller. The first terminal and the second terminal are connected to a positive electrode and a negative electrode, respectively, of the DC power supply. The third terminal and the fourth terminal output the AC voltage. The full-bridge circuit includes a first leg and a second leg connected in parallel between the first terminal and the second terminal. The reactor is connected between the third terminal and a first connection point connecting an upper arm and a lower arm of the first leg. The switching-mode changer generates a signal for switching the mode of operation of the full-bridge circuit to a first switching mode or a second switching mode. The PWM controller causes the full-bridge circuit to operate in the first switching mode or the second switching mode in accordance with the signal. The fourth terminal is connected to a second connection point connecting an upper arm and a lower arm of the second leg. In the first switching mode, the upper arm of the first leg and the lower arm of the second leg are switched synchronously, and the lower arm of the first leg and the upper arm of the second leg are non-conducting. In the second switching mode, the lower arm of the first leg and the upper arm of the second leg are switched synchronously, and the upper arm of the first leg and the lower arm of the second leg are non-conducting. The switching-mode changer adjusts the phase of the signal so that reactive power output from the third terminal and the fourth terminal or a distortion rate of the AC voltage is reduced.

Advantageous Effects of Invention

According to the power conversion device of a certain aspect of the present disclosure, two of the four arms are switched and the rest are placed in a non-conducting state. Thus, the switching losses can be reduced, as compared to switching all the arms. Further, the phase of the signal for switching the mode of operation of the full-bridge circuit is adjusted so that the reactive power is reduced or the distortion rate of the AC voltage is reduced. Thus, the output power is stabilized. As such, the power conversion device can reduce the switching losses and stabilize the output power.

DESCRIPTION OF EMBODIMENTS

Hereinafter, embodiments according to the present disclosure will be described, with reference to the accompanying drawings. Note that the same reference signs are used to refer to the same or like parts, and the description thereof will not be repeated. The embodiments and variations thereof described below may be selectively combined as appropriate.

Embodiment 1

Configuration of Power Conversion Device

Figure 1:
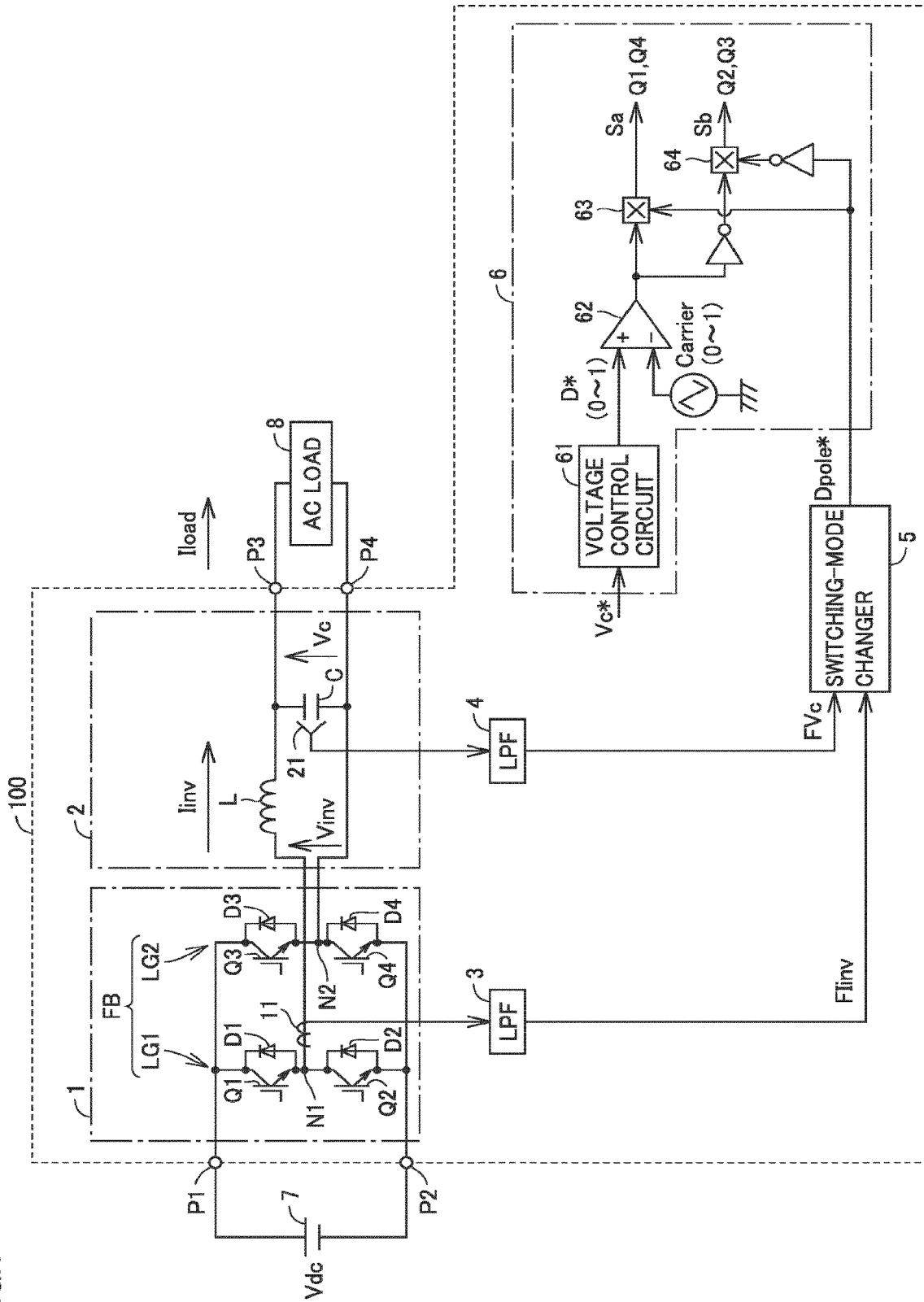
FIG. 1 is a block diagram showing a configuration of a power conversion device according to Embodiment 1.

Referring to FIG. 1, a configuration of a power conversion device 100 according to Embodiment 1 will be described. FIG. 1 is a block diagram showing a configuration of power conversion device 100 according to Embodiment 1. As shown in FIG. 1, power conversion device 100 includes a first terminal P1, a second terminal P2, a third terminal P3, a fourth terminal P4, an inverter 1, an LC filter 2, low-pass filters 3, 4, a switching-mode changer 5, and a PWM (Pulse Width Modulation) controller 6.

Power conversion device 100 converts a direct-current (DC) voltage from a DC power supply 7 into an alternating-current (AC) voltage and outputs the AC voltage to an AC load 8. Power conversion device 100 operates in a discontinuous conduction mode near a zero crossing at which the output AC current alternates in polarity between positive and negative. In the discontinuous conduction mode, there is a time period in which the current output from inverter 1 is zero.

First terminal P1 and second terminal P2 are connected to the positive electrode and the negative electrode, respectively, of DC power supply 7. DC power supply 7 is a constant voltage source, such as a cell, or a control voltage source for a power convertor that can output DC voltage.

Third terminal P3 and fourth terminal P4 are connected to AC load 8, and output AC voltage. AC load 8 is, for example, a resistance load, an inductive load, a rectifier load, or an appliance load. An AC power supply, such as a single-phase AC system, may be connected to third terminal P3 and fourth terminal P4, instead of AC load 8.

Inverter 1 includes a full-bridge circuit FB. Full-bridge circuit FB includes a first leg LG1, a second leg LG2, and a current sensor 11. First leg LG1 and second leg LG2 are connected in parallel between first terminal P1 and second terminal P2.

First leg LG1 includes an upper arm Q1, a lower arm Q2, and freewheel diodes D1, D2. Upper arm Q1 and lower arm Q2 are connected in series, between first terminal P1 and second terminal P2. Freewheel diode D1 is connected in anti-parallel with upper arm Q1. Freewheel diode D2 is connected in anti-parallel with lower arm Q2. A first connection point N1 connecting upper arm Q1 and lower arm Q2 is connected to LC filter 2.

Second leg LG2 includes an upper arm Q3, a lower arm Q4, and freewheel diodes D3, D4. Upper arm Q3 and lower arm Q4 are connected in series, between first terminal P1 and second terminal P2. Freewheel diode D3 is connected in anti-parallel with upper arm Q3. Freewheel diode D4 is connected in anti-parallel with lower arm Q4. A second connection point N2 connecting upper arm Q3 and lower arm Q4 is connected to fourth terminal P4.

Full-bridge circuit FB operates in a first switching mode or a second switching mode. In the first switching mode, upper arm Q1 and lower arm Q4 are switched synchronously, and lower arm Q2 and upper arm Q3 are non-conducting. In the second switching mode, lower arm Q2 and upper arm Q3 are switched synchronously, and upper arm Q1 and lower arm Q4 are non-conducting.

Upper arms Q1, Q3 and lower arms Q2, Q4 are self-arc-extinguishing semiconductor switching elements that are represented by, for example, IGBT (Insulated Gate Bipolar Transistor) or MOSFET (Metal Oxide Semiconductor Field Effective Transistor). If upper arms Q1, Q3 and lower arms Q2, Q4 are MOSFETs, parasitic diodes included in MOSFETs may be used, instead of freewheel diodes D1 to D4.

LC filter 2 includes a reactor L, a capacitor C, and a voltage sensor 21. Reactor L is connected between first connection point N1 and third terminal P3. Capacitor C is connected between third terminal P3 and fourth terminal P4.

LC filter 2 smooths a reactor current Iinv, which is generated by a potential difference between an output voltage Vinv of inverter 1 and a voltage Vc (C voltage) across capacitor C, and outputs the smoothed current to AC load 8. Output voltage Vinv is a voltage between first connection point N1 and second connection point N2, and output from inverter 1 to LC filter 2. Reactor current Iinv flows from first connection point N1 between upper arm Q1 and lower arm Q2 to reactor L of LC filter 2.

Current sensor 11 included in inverter 1 measures reactor current Iinv flow from first connection point N1 to reactor L, and outputs the measurement to low-pass filter 3. Voltage sensor 21 included in LC filter 2 measures voltage Vc across capacitor C, and outputs the measurement to low-pass filter 4. Voltage Vc is an AC voltage that is output from third terminal P3 and fourth terminal P4.

Having received the value of reactor current Iinv measured by current sensor 11, low-pass filter 3 outputs a current value FIinv to switching-mode changer 5. Current value FIinv is obtained by reducing the high-frequency component of reactor current Iinv. Low-pass filter 3 may be omitted if power conversion device 100 can obtain, in the discontinuous conduction mode, information for allowing compensation for a difference between the sampled value and an average current of currents in periods including a period in which the current is zero. If the current flow to capacitor C included in LC filter 2 is sufficiently small and the phase difference in fundamental wave between reactor current Iinv and a load current Iload flow through AC load 8 is small, low-pass filter 3 may receive load current Iload, instead of reactor current Iinv.

Having received the value of voltage Vc measured by voltage sensor 21, low-pass filter 4 outputs a voltage value FVc to switching-mode changer 5. Voltage value FVc is obtained by reducing a sampling error in voltage Vc caused by the switching noise of full-bridge circuit FB. Low-pass filter 4 may be omitted if effects of the switching noise of full-bridge circuit FB are small.

Switching-mode changer 5 generates a reference signal Dpole* for switching the mode of operation of full-bridge circuit FB to the first switching mode or the second switching mode. When reference signal Dpole* is 1, full-bridge circuit FB operates in the first switching mode. When reference signal Dpole* is 0, full-bridge circuit FB operates in the second switching mode. Switching-mode changer 5 adjusts the phase of reference signal Dpole* so that reactive power output from power conversion device 100 is reduced. A method of adjustment of the phase of reference signal Dpole* by switching-mode changer 5 will be described below.

PWM controller 6 generates PWM signals Sa, Sb, using an output voltage command value Vc* received from a higher-level control unit, a reference triangular wave Carrier, and reference signal Dpole*. PWM controller 6 includes a voltage control circuit 61, a comparator 62, and multipliers 63, 64.

Voltage control circuit 61 generates a conduction ratio command value D*, based on output voltage command value Vc*. Comparator 62 compares conduction ratio command value D* with reference triangular wave Carrier. When reference triangular wave Carrier is less than conduction ratio command value D*, comparator 62 outputs a signal set to 1 (high level). When reference triangular wave Carrier is greater than or equal to conduction ratio command value D*, comparator 62 outputs a signal set to 0 (low level).

Conduction ratio command value D* is in a range from 0 to 1, and represented by Equation (1) below. In Equation (1), m denotes a value in a range from 0 to 1, indicating a modulation coefficient for the inverter, ω denotes an angular frequency obtained by multiplying the frequency (e.g., 50 Hz or 60 Hz) of output alternating current by 2π, and t denotes a time.

$$D^* = 0.5(m \times \sin \omega t + 1) \quad \text{Equation (1)}$$

Reference triangular wave Carrier is a triangular wave in a range from 0 to 1, and has a carrier period.

Multiplier 63 multiplies the output signal of comparator 62 by reference signal Dpole*, thereby generating PWM signal Sa. For this reason, when reference signal Dpole* is 1, multiplier 63 generates PWM signal Sa whose conduction ratio is D*. When reference signal Dpole* is 0, multiplier 63 generates PWM signal Sa having a value 0. PWM signal Sa is output to upper arm Q1 and lower arm Q4. Upper arm Q1 and lower arm Q4 are on when PWM signal Sa is 1, and off when PWM signal Sa is 0.

Multiplier 64 multiplies an inverted signal of the output signal of comparator 62 by an inverted signal of reference signal Dpole*, thereby generating PWM signal Sb. For this reason, when reference signal Dpole* is 0, multiplier 64 generates PWM signal Sb whose conduction ratio is (1−D*). When reference signal Dpole* is 1, multiplier 64 generates PWM signal Sb having a value 0. PWM signal Sb is output to lower arm Q2 and upper arm Q3. Lower arm Q2 and upper arm Q3 are on when PWM signal Sb is 1, and off when PWM signal Sb is 0.

As such, PWM controller 6 outputs a signal having a pulse width modulated in accordance with a result of comparison of conduction ratio command value D* with reference triangular wave Carrier. In other words, when reference signal Dpole* is 1, PWM controller 6 generates PWM signal Sa whose conduction ratio is D* and generates PWM signal Sb having a value 0. This causes full-bridge circuit FB to operate in the first switching mode. When reference signal Dpole* is 0, PWM controller 6 generates PWM signal Sb whose conduction ratio is (1−D*) and generates PWM signal Sa having a value 0. This causes full-bridge circuit FB to operate in the second switching mode.

Switching-Mode Changer

Next, a method of adjustment of the phase of reference signal Dpole* by switching-mode changer 5 will be described. Switching-mode changer 5 adjusts the phase of reference signal Dpole* for each predetermined period T. Period T is, for example, a cycle of an alternating current indicated by output voltage command value Vc*.

Figure 2:
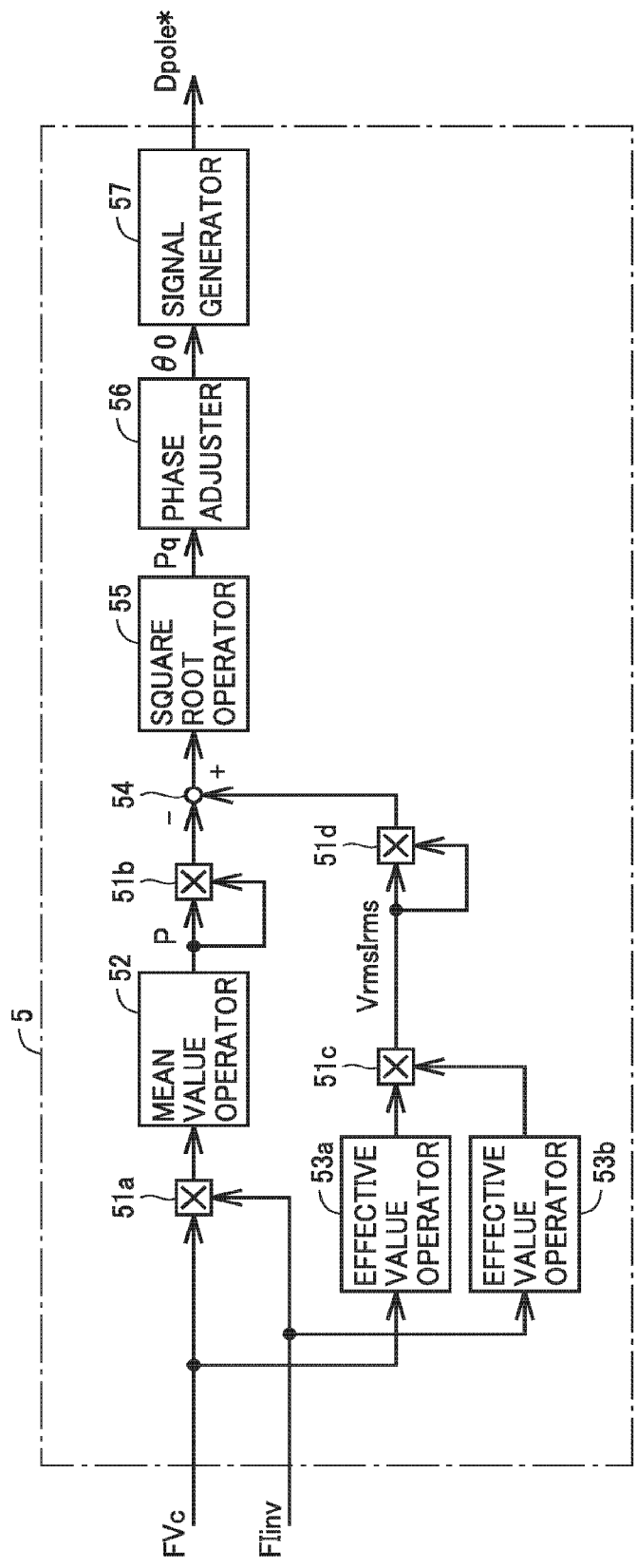
FIG. 2 is a block diagram showing a configuration of a switching-mode changer shown in FIG. 1.

FIG. 2 is a block diagram showing a configuration of switching-mode changer 5. As shown in FIG. 2, switching-mode changer 5 includes multipliers 51a to 51d, a mean value operator 52, effective value operators 53a, 53b, a subtractor 54, a square root operator 55, a phase adjuster 56, and a signal generator 57. The components of switching-mode changer 5 are configured of, for example, a memory storing, for example, a program describing processing operations, and a processor for execution of the program. The processor is configured of, for example, a microcomputer, a DSP (Digital Signal Processor), an FPGA, etc.

Multiplier 51a multiplies voltage value FVc, received from low-pass filter 4, by current value FIinv received from low-pass filter 3. Mean value operator 52 computes, for each period T, effective power value P which is the mean value of values output from multiplier 51a during the period T. Multiplier 51b computes a square value of effective power value P output from mean value operator 52.

Effective value operator 53a computes, for each period T, an effective value Vrms for voltage values FVc that are received from low-pass filter 4 during the period T. Effective value multiplier 53b computes, for each period T, an effective value Irms for current values FIinv that are received from low-pass filter 3 during the period T. Multiplier 51c computes a product VrmsIrms of effective values Vrms, Irms which are respectively output from effective value operators 53a, 53b. Multiplier 51d computes a square value of product VrmsIrms output from multiplier 51c.

Subtractor 54 computes and outputs a difference between the square value of product VrmsIrms and the square value of effective power value P. Square root operator 55 computes and outputs a square root value Pq of the output value from subtractor 54.

If frequency components of current value FIinv and frequency components of voltage value FVc include the same frequency, product VrmsIrms indicates an apparent power output from power conversion device 100, and square root value Pq indicates a reactive power output from power conversion device 100. Similarly, if frequency components of current value FIinv and frequency components of voltage value FVc include multiple, identical harmonics, square root value Pq, again, indicates a reactive power output from power conversion device 100.

Phase adjuster 56 computes an adjustment θ0 for the phase of reference signal Dpole*, based on the immediately preceding square root value Pq and square root value Pq0 most recently output from square root operator 55. Using adjustment θ0 output from phase adjuster 56, signal generator 57 generates reference signal Dpole* based on Equation (2). In Equation (2), ω denotes an angular frequency obtained by multiplying the frequency (e.g., 50 Hz or 60 Hz) of output alternating current by 2π.

[MATH 1]

$$Dpole^* = \begin{cases} 1 \text{ if } \frac{\sin(\omega t + \theta 0)}{|\sin(\omega t + \theta 0)|} \geq 0, \\ 0 \text{ if } \frac{\sin(\omega t + \theta 0)}{|\sin(\omega t + \theta 0)|} < 0 \end{cases} \quad \text{Equation (2)}$$

Process by Phase Adjuster

Figure 3:
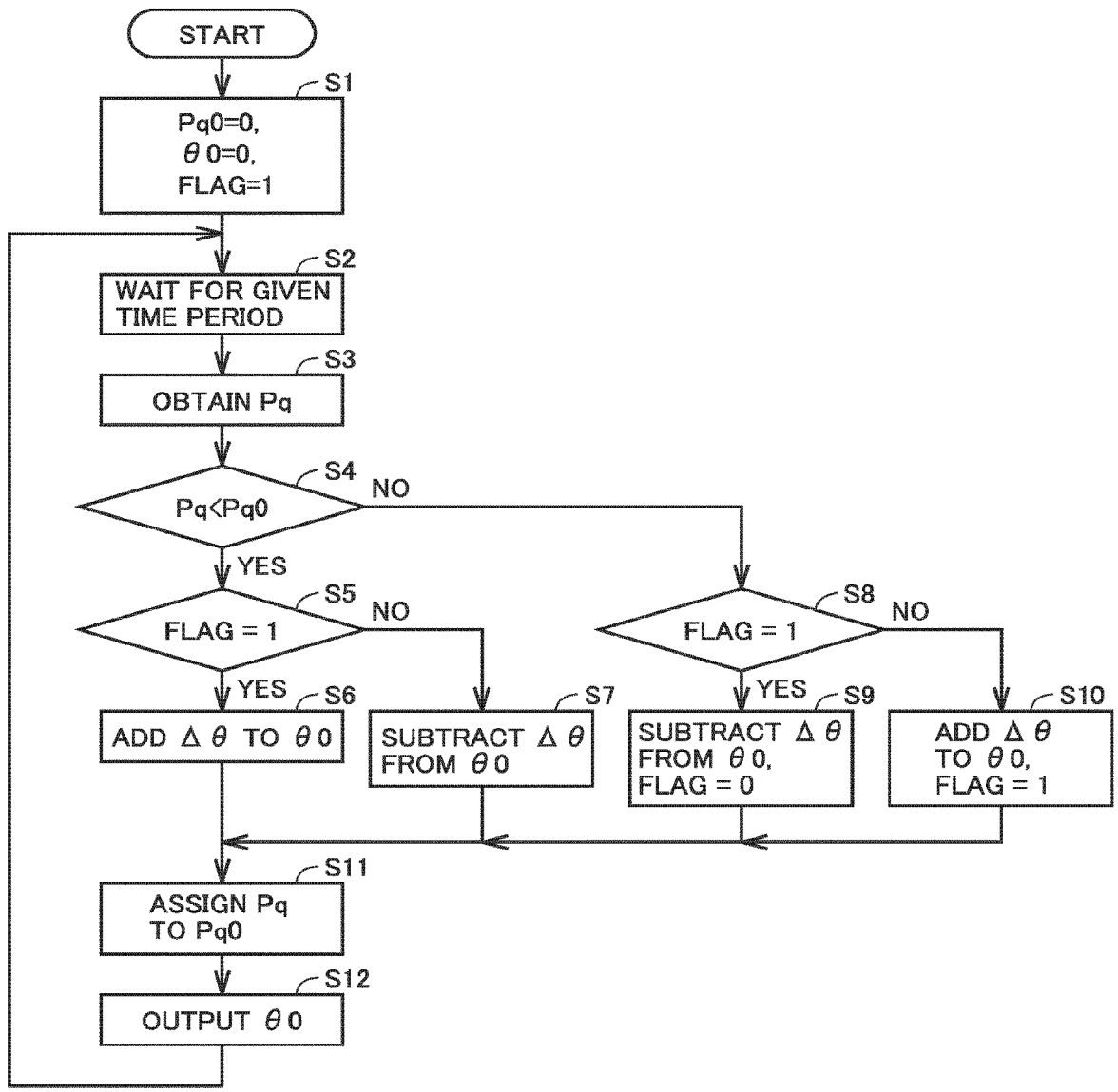
FIG. 3 is a process flow diagram of a phase adjuster shown in FIG. 2.

FIG. 3 is a process flow diagram of phase adjuster 56. Initially, in step S1, phase adjuster 56 assigns 0 to Pq0, 0 to θ0, and 1 to the flag. Here, the phase (the initial phase) of reference signal Dpole*, generated when θ0=0, matches the phase of output voltage command value Vc* that is received from a higher-level control unit. The flag indicates a direction of adjustment of adjustment θ0 in the immediately preceding period T. Specifically, the flag=1 indicates that adjustment θ0 has been adjusted in the positive direction in the immediately preceding period T. The flag=0 indicates that adjustment θ0 has been adjusted to in the negative direction in the immediately preceding period T.

In step S2, phase adjuster 56 waits for a given time period (here, period T). Next, in step S3, phase adjuster 56 obtains square root value Pq from square root operator 55. In step S4, phase adjuster 56 compares square root value Pq, obtained in step S3, with Pq0.

If Pq<Pq0 (Yes in step S4), phase adjuster 56 confirms whether the flag is 1 in step S5. If the flag is 1 (YES in step S5), phase adjuster 56 adds a predetermined unit adjustment Δθ to adjustment θ0 in step S6. If the flag is 0 (NO in step S5), phase adjuster 56 subtracts unit adjustment Δθ from adjustment θ0 in step S7.

If Pq≥Pq0 (NO in step S4), phase adjuster 56 confirms whether the flag is 1 in step S8. If the flag is 1 (YES in step S8), phase adjuster 56 subtracts unit adjustment Δθ from adjustment θ0 and changes the flag to 0 in step S9. If the flag is 0 (NO in step S8), phase adjuster 56 adds unit adjustment Δθ to adjustment θ0 and changes the flag to 1 in step S10.

After steps S6, S7, S9, S10, phase adjuster 56, in step S11, assigns Pq, received in step S4, to Pq0. Phase adjuster 56 then outputs adjustment θ0 in step S12. After step S12, the process returns to step S2.

In steps S4 to S12, if square root value Pq is less than the immediately preceding square root value Pq0, unit adjustment Δθ is added/subtracted to/from adjustment θ0 in the same manner as the immediately preceding process. If square root value Pq is greater than the immediately preceding square root value Pq0, unit adjustment Δθ is added/subtracted to/from adjustment θ0 in a manner different from the immediately preceding process. This adjusts the phase of reference signal Dpole* so that the reactive power output from power conversion device 100 is reduced.

Example Operation

Figure 4:
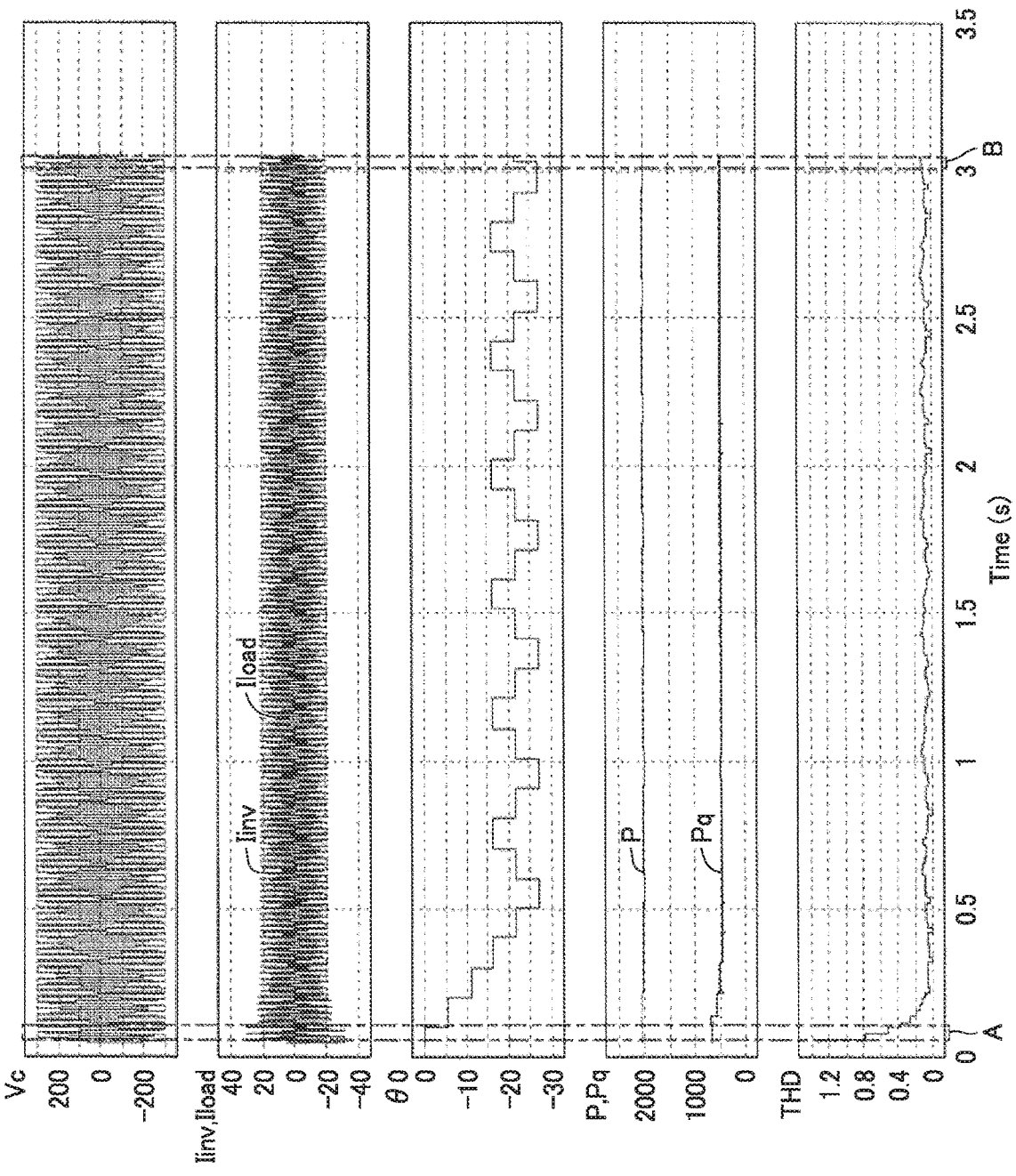
FIG. 4 is a diagram showing an example operation of the power conversion device according to Embodiment 1 when an alternating-current (AC) load is a resistance load.
Figure 5:
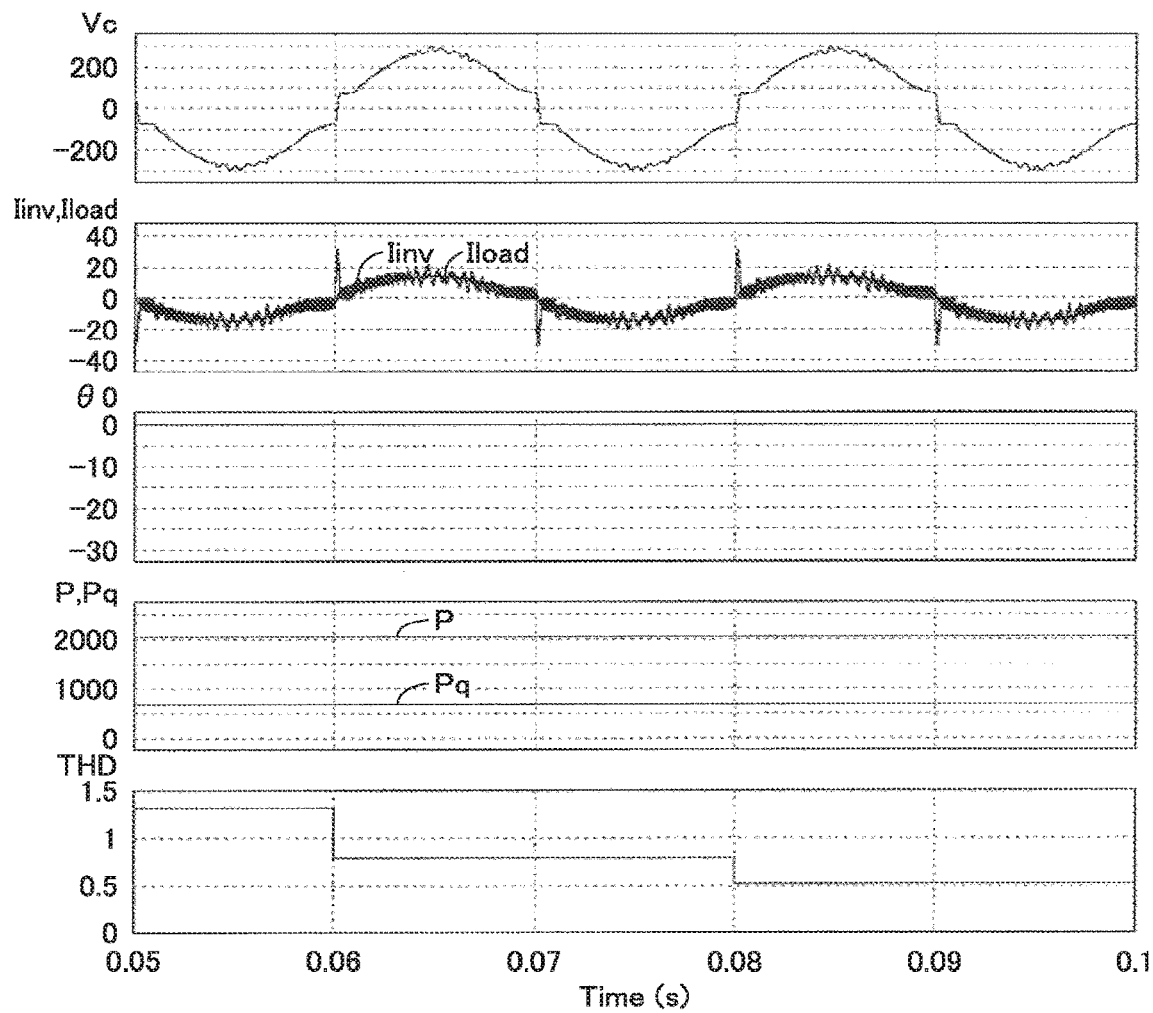
FIG. 5 is an enlarged view (of A portion) immediately after the start of the operation in FIG. 4.
Figure 6:
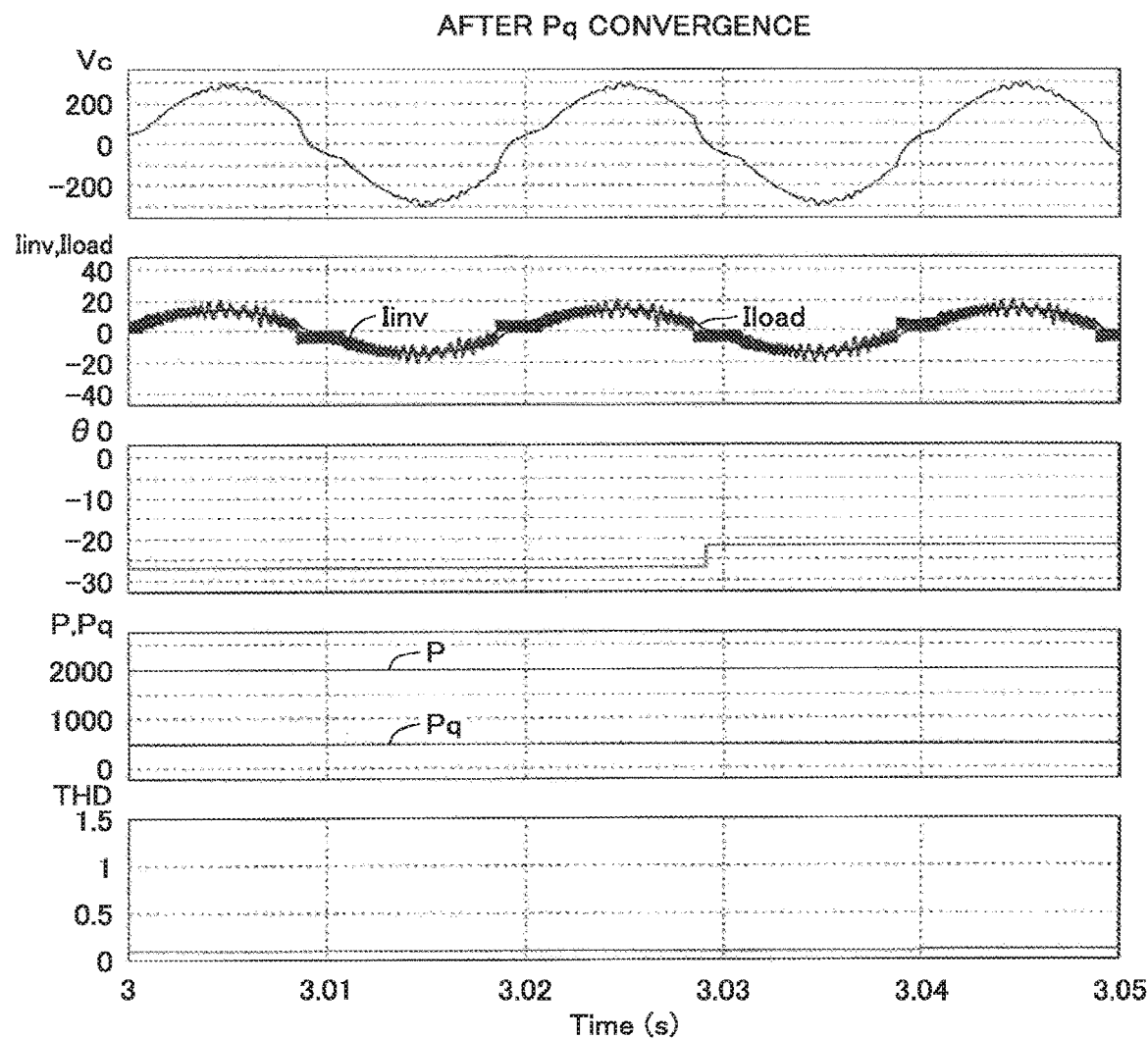
FIG. 6 is an enlarged view (of B portion) immediately before the end of the operation in FIG. 4.
Figure 7:
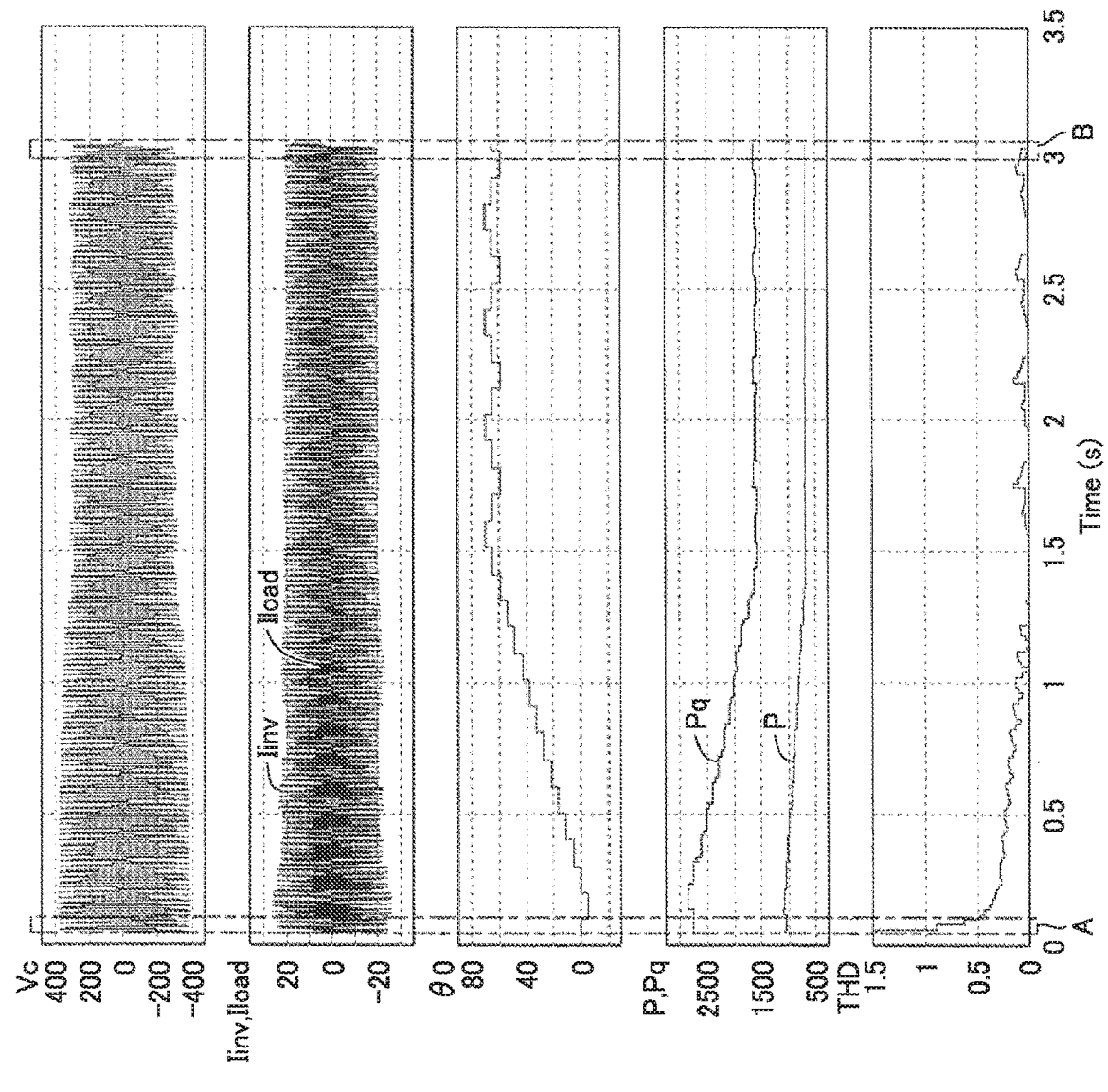
FIG. 7 is a diagram showing an example operation of the power conversion device according to Embodiment 1 when the AC load is an inductive load.
Figure 8:
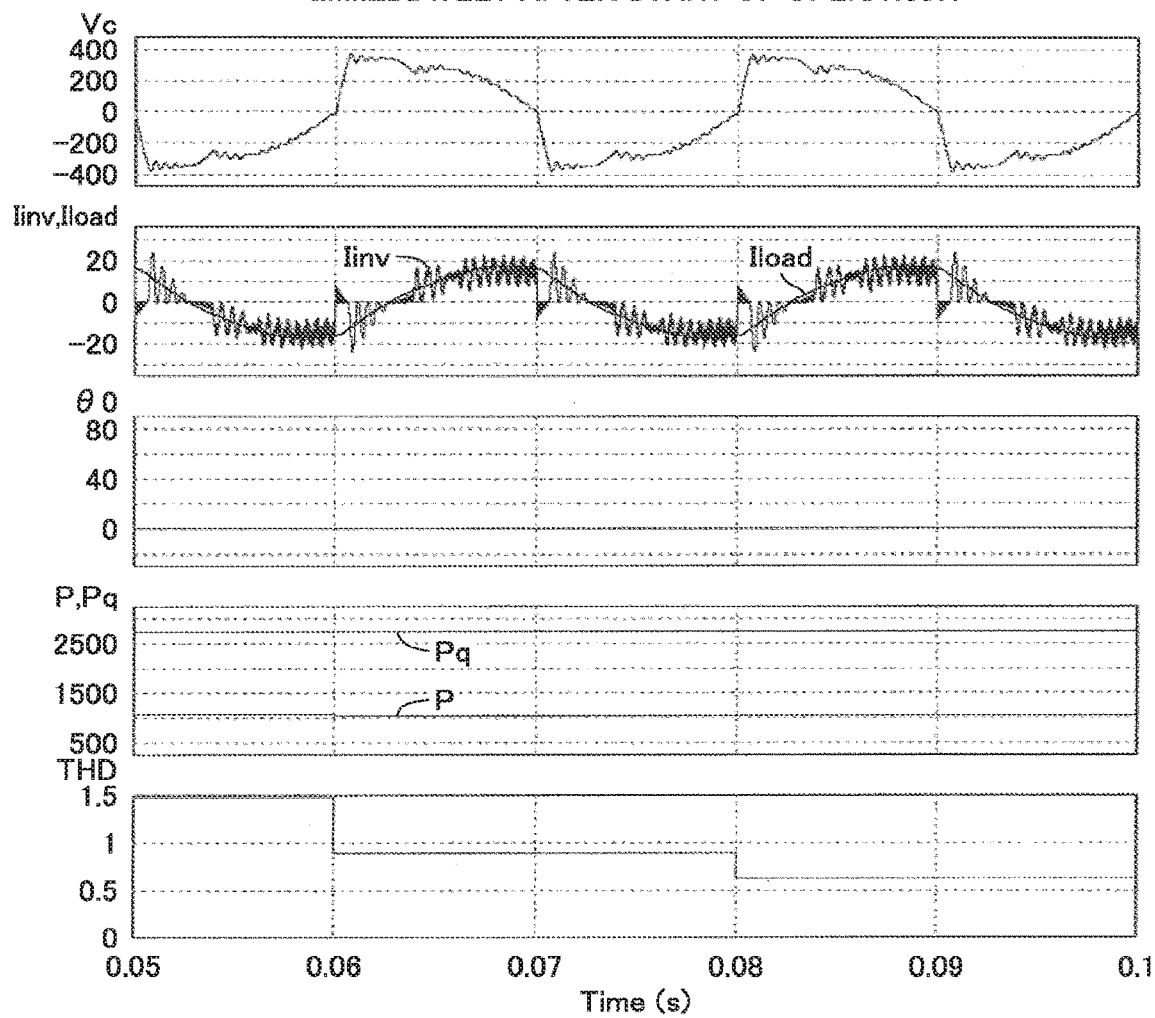
FIG. 8 is an enlarged view (of A portion) immediately after the start of the operation in FIG. 7.
Figure 9:
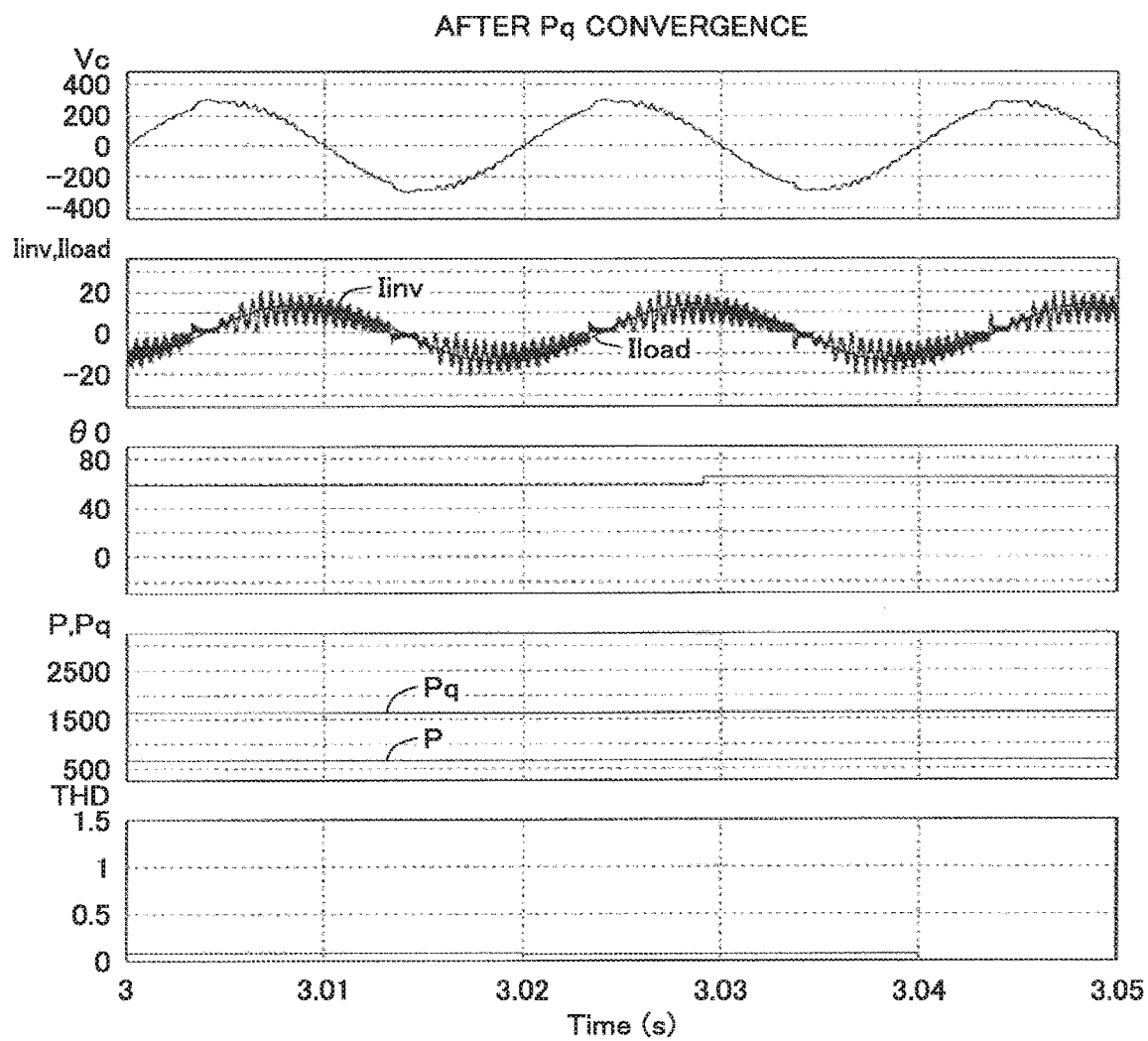
FIG. 9 is an enlarged view (of B portion) immediately before the end of the operation in FIG. 7.
Figure 10:
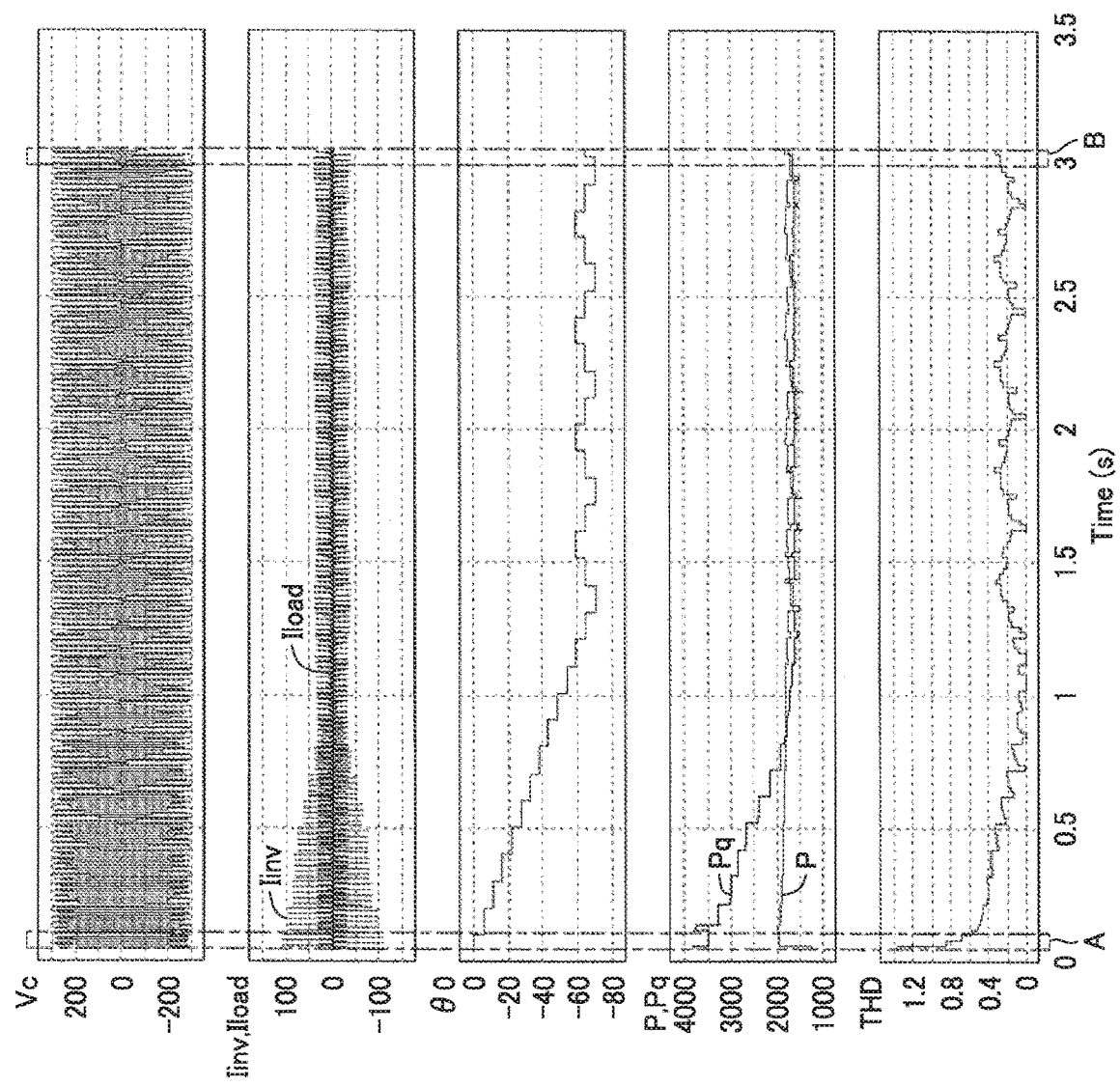
FIG. 10 is a diagram showing an example operation of the power conversion device according to Embodiment 1 when the AC load is a rectifier load.
Figure 11:
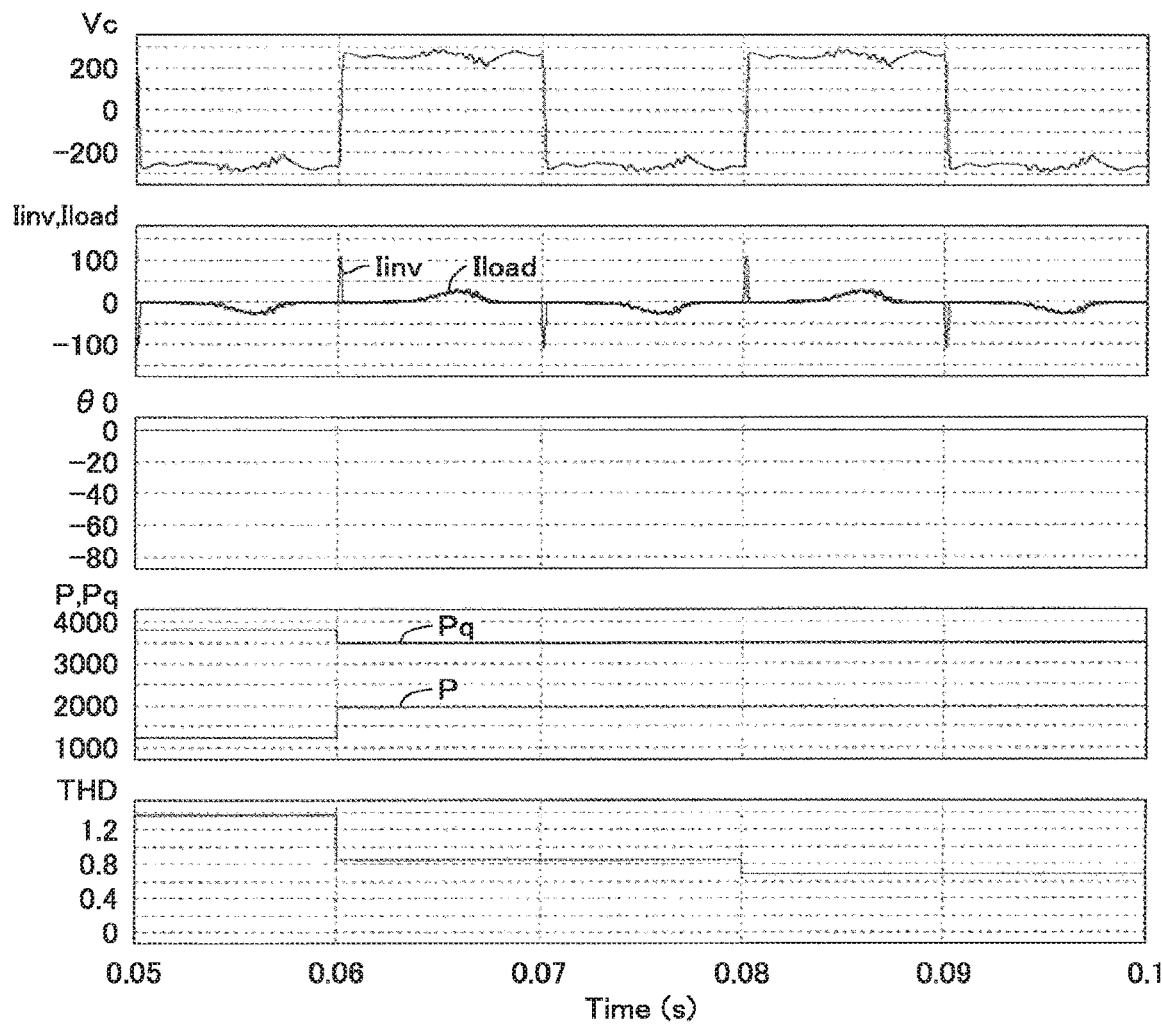
FIG. 11 is an enlarged view (of A portion) immediately after the start of the operation in FIG. 10.
Figure 12:
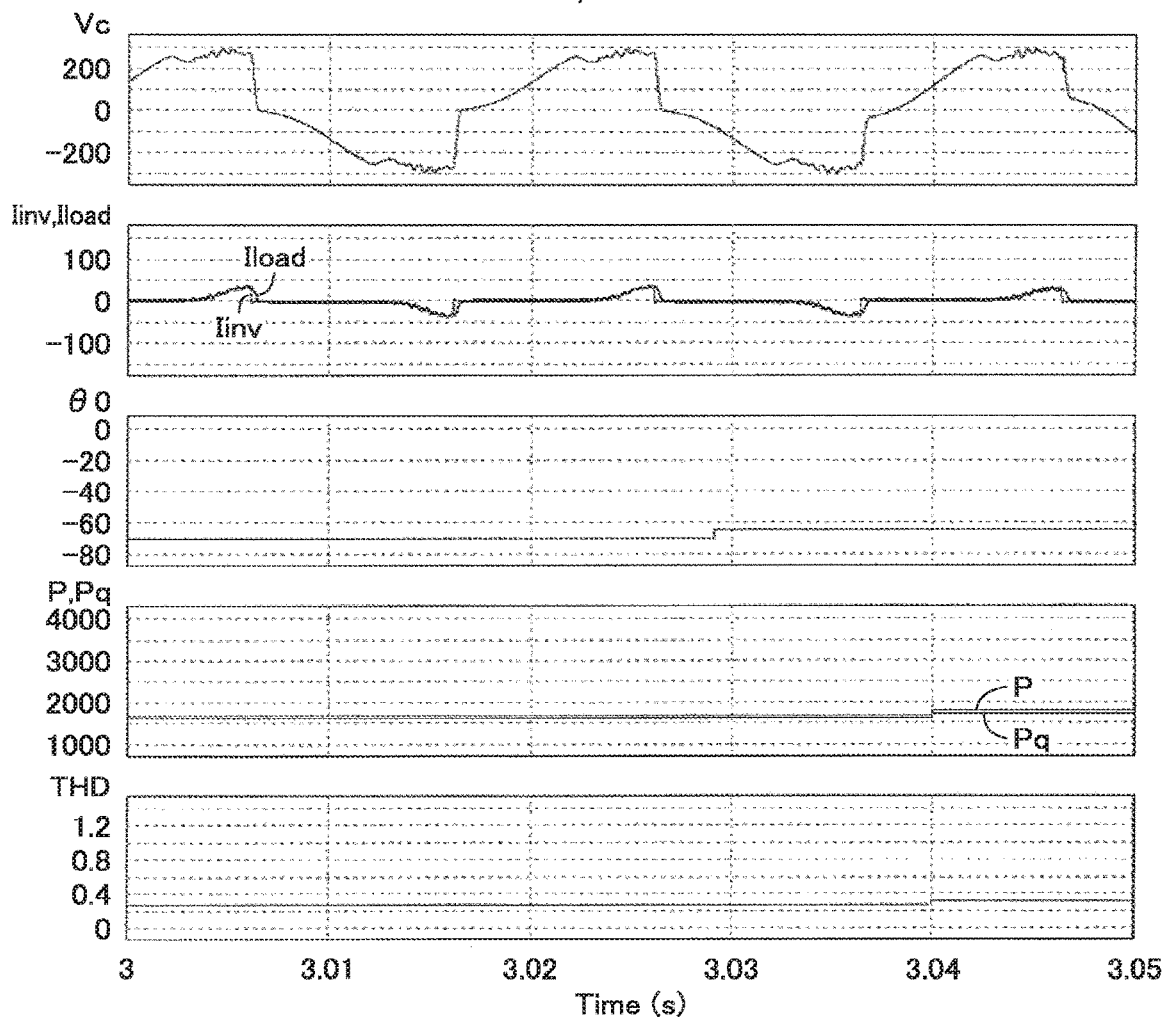
FIG. 12 is an enlarged view (of B portion) immediately before the end of the operation in FIG. 10.

FIG. 4 is an example operation of power conversion device 100 when AC load 8 is a resistance load. FIG. 5 is an enlarged view (of A portion of FIG. 4) immediately after the start of the operation of power conversion device 100 in FIG. 4. FIG. 6 is an enlarged view (of B portion of FIG. 4) immediately before the end of the operation of power conversion device 100 in FIG. 4. FIG. 7 shows an example operation of power conversion device 100 when AC load 8 is an inductive load. FIG. 8 is an enlarged view (of A portion of FIG. 7) immediately after the start of the operation of power conversion device 100 in FIG. 7. FIG. 9 is an enlarged view (of B portion of FIG. 7) immediately before the end of the operation of power conversion device 100 in FIG. 7. FIG. 10 shows an example operation of power conversion device 100 when AC load 8 is a rectifier load. FIG. 11 is an enlarged view (of A portion of FIG. 10) immediately after the start of the operation of power conversion device 100 in FIG. 10. FIG. 12 is an enlarged view (of B portion of FIG. 10) immediately before the end of the operation of power conversion device 100 in FIG. 10. In FIGS. 4 to 12, the first graph shows voltage Vc (C voltage), the second graph shows reactor current Iinv and load current Iload, the third graph shows adjustment 90, the fourth graph shows effective power value P and square root value Pq, and the fifth graph shows the total harmonic distortion (THD) factor for voltage Vc.

As shown in FIGS. 4 to 12, one can notice that square root value Pq, corresponding to the reactive power, gradually decreases and converges over time since the start of the operation of power conversion device 100. This suggests that power conversion device 100 inhibits the reactive power, thereby allowing supply of stable power to AC load 8.

Further, one can notice that the total harmonic distortion rate of voltage Vc also gradually decreases and converges over time since the start of the operation of power conversion device 100. This indicates that the less the total harmonic distortion rate of voltage Vc is, the less the distortion of AC voltage output from power conversion device 100. The less the distortion of the AC voltage, the closer the characteristics of the AC voltage to the characteristics of AC voltage supplied from an AC system. This suggests that power conversion device 100 outputs an AC voltage having characteristics close to the characteristics of the AC voltage supplied from the AC system.

In particular, if AC load 8 is an inductive load, the AC voltage output from power conversion device 100 and the AC current flow through AC load 8 are out of phase. Thus, voltage Vc, reactor current Iinv, and load current Iload are unstable at the start of the operation of power conversion device 100. However, the waveforms of voltage Vc, reactor current Iinv, and load current Iload are stabilized over time.

Furthermore, as shown in FIGS. 10 to 12, if AC load 8 is a rectifier load, a spike current, occurred at the start of the operation of power conversion device 100, is gradually inhibited.

As shown in FIGS. 4 to 12, power conversion device 100 operates in the discontinuous conduction mode near the zero crossing at which load current Iload alternates in polarity between positive and negative. In the discontinuous conduction mode, there is a time period in which reactor current Iinv, output from inverter 1, is zero. This is because either upper arm Q1 and lower arm Q4 or lower arm Q2 and upper arm Q3 are switched between on and off and the rest are non-conducting, and a duration of no current thus occurs as the conduction ratio command value D* decreases.

Advantageous Effects

As described above, power conversion device 100 includes first terminal P1, second terminal P2, third terminal P3, fourth terminal P4, full-bridge circuit FB, reactor L, switching-mode changer 5, and PWM controller 6. First terminal P1 and second terminal P2 are respectively connected to the positive electrode and negative electrode of DC power supply 7. Third terminal P3 and fourth terminal P4 output AC voltage. Full-bridge circuit FB includes first leg LG1 and second leg LG2 connected in parallel between first terminal P1 and second terminal P2. Reactor L is connected between third terminal P3 and first connection point N1 connecting upper arm Q1 and lower arm Q2 of first leg LG1. Switching-mode changer 5 generates reference signal Dpole* for switching the mode of operation of full-bridge circuit FB to the first switching mode or the second switching mode. PWM controller 6 causes full-bridge circuit FB to operate in the first switching mode or the second switching mode, in accordance with reference signal Dpole*. Fourth terminal P4 is connected to second connection point N2 connecting upper arm Q3 and lower arm Q4 of second leg LG2. In the first switching mode, upper arm Q1 of first leg LG1 and lower arm Q4 of second leg LG2 are switched synchronously, and lower arm Q2 of first leg LG1 and upper arm Q3 of second leg LG2 are non-conducting. In the second switching mode, lower arm Q2 and upper arm Q3 are switched synchronously, and upper arm Q1 and lower arm Q4 are non-conducting. Switching-mode changer 5 adjusts the phase of reference signal Dpole* so that the reactive power output from third terminal P3 and fourth terminal P4 is reduced.

According to the above configuration, two of the four arms included in full-bridge circuit FB are switched synchronously, and the rest are non-conducting. Specifically, half of the four arms are controlled to an off-state per half the period of the output AC voltage. For this reason, the switching losses can be reduced, as compared to the conventional technology which simultaneously switches the four arms.

Third terminal P3 is connected to first connection point N1 connecting upper arm Q1 and lower arm Q2 of first leg LG1 via reactor L. Fourth terminal P4 is connected to second connection point N2 connecting upper arm Q3 and lower arm Q4 of second leg LG2. For this reason, if (i) the zero crossing timing at which the AC current, flow through the load connected to third terminal P3 and fourth terminal P4, alternates in polarity and (ii) the timing at which the first switching mode and the second switching-mode changer are out of sync, the output power becomes unstable. However, with the above configuration, switching-mode changer 5 adjusts the phase of reference signal Dpole* so that the reactive power is reduced. This can inhibit the output power from becoming unstable due to the switching timing of the arms and the zero crossing timing being out of sync, thereby supplying stable power to AC load 8. As such, power conversion device 100 achieves reduction in the switching losses and stabilization of output power.

Switching-mode changer 5 periodically obtains square root value (parameter value) Pq that correlates with the reactive power and adjusts the phase of reference signal Dpole*. Square root value Pq is calculated using effective power value P output from third terminal P3 and fourth terminal P4, effective value Vrms of voltage Vc, and effective value Irms of reactor current Iinv. Square root value Pq increases with an increase of the reactive power. For this reason, switching-mode changer 5 adjusts the phase of reference signal Dpole* in the same direction as the immediately preceding direction of adjustment if the newly obtained square root value Pq is less than the most recently obtained square root value Pq0. If the newly obtained square root value Pq is greater than the most recently obtained square root value Pq0, switching-mode changer 5 adjusts the phase of reference signal Dpole* in a direction opposite the immediately preceding direction of adjustment. This allows switching-mode changer 5 to readily adjust the phase of reference signal Dpole* so that the reactive power is reduced.

PWM controller 6 controls the operation of full-bridge circuit FB, based on output voltage command value Vc*. Switching-mode changer 5 starts adjusting the phase of reference signal Dpole* using the phase of output voltage command value Vc* as the initial phase for reference signal Dpole*. This allows, when AC load 8 is a resistance load, the initial phase of reference signal Dpole* to be set to some extent close to the phase of the output current even if the output current cannot be observed. As a result, the phase of reference signal Dpole* can converge quickly.

Embodiment 2

Figure 13:
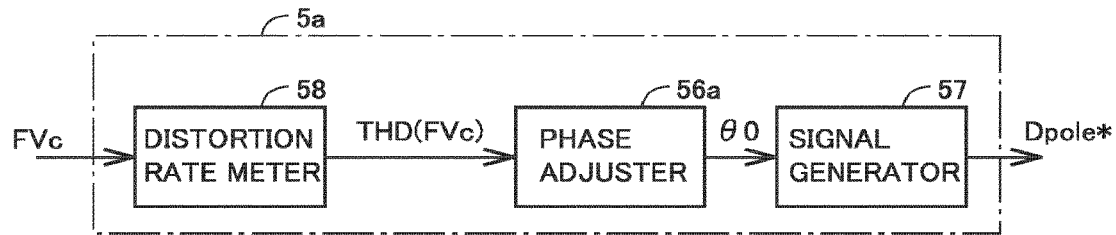
FIG. 13 is a block diagram showing a configuration of a switching-mode changer included in a power conversion device according to Embodiment 2.

Referring to FIG. 13, a power conversion device according to Embodiment 2 will be described. FIG. 13 is a block diagram showing a configuration of a switching-mode changer 5a included in the power conversion device according to Embodiment 2. The power conversion device according to Embodiment 2 is different from power conversion device 100 according to Embodiment 1 in that the power conversion device according to Embodiment 2 includes switching-mode changer 5a shown in FIG. 13, instead of switching-mode changer 5. The other details of the power conversion device according to Embodiment 2 are the same as power conversion device 100 shown in FIG. 1, and thus the descriptions thereof will not be repeated. Note that the power conversion device according to Embodiment 2 may not be provided with current sensor 11 and low-pass filter 3 shown in FIG. 1.

Switching-Mode Changer

Switching-mode changer 5a adjusts the phase of reference signal Dpole* for each predetermined period T. Period T is, for example, a cycle of an alternating current indicated by the output voltage command or the output current command. As shown in FIG. 13, switching-mode changer 5a includes a distortion rate meter 58, a phase adjuster 56a, and a signal generator 57. Components of switching-mode changer 5a are configured of, for example, a memory storing, for example, a program describing processing operations, and a processor for execution of the program.

Distortion rate meter 58 measures, for each period T, the total harmonic distortion rate THD (FVc) of voltage value FVc received in the period T. Phase adjuster 56a computes adjustment θ0 for the phase of reference signal Dpole*, based on the total harmonic distortion rate THD (FVc) and the most recently measured total harmonic distortion rate THD0. As with Embodiment 1, signal generator 57 generates reference signal Dpole* based on Equation (2) below, using adjustment θ0 output from phase adjuster 56a.

Process by Phase Adjuster

Figure 14:
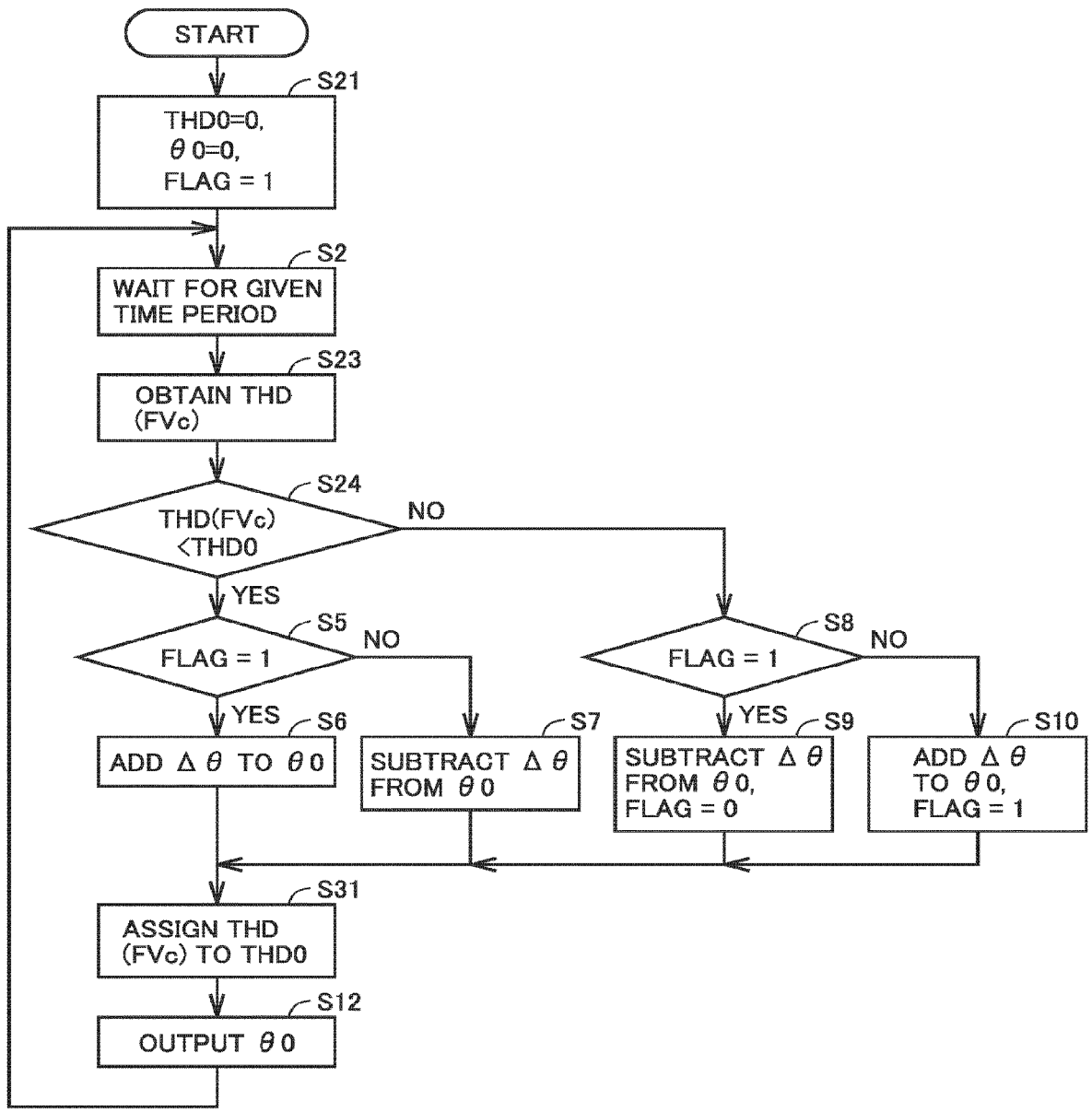
FIG. 14 is a process flow diagram of a phase adjuster shown in FIG. 13.

FIG. 14 is a process flow diagram of phase adjuster 56a. The process of phase adjuster 56a is the same as the process of phase adjuster 56 according to Embodiment 1, shown in FIG. 3, except that the process of phase adjuster 56a includes execution of steps S21, S23, S24, S31, instead of steps S1, S3, S4, S11.

In step S21, phase adjuster 56a makes settings as follows: THD0=0, θ0=0, the flag=1. In step S2, phase adjuster 56a waits for period T, after which it obtains, in step S23, the total harmonic distortion rate THD (FVc) of voltage value FVc from distortion rate meter 58. In step S24, phase adjuster 56a compares the total harmonic distortion rate THD (FVc), obtained in step S23, with THD0.

If THD (FVc)<THD0 (Yes in step S24), phase adjuster 56a confirms whether the flag is 1 in step S5, as with Embodiment 1. Phase adjuster 56a adds/subtracts unit adjustment Δθ to/from adjustment θ0, in accordance with a value of the flag (steps S6, S7). If THD (FVc)≥THD0 (NO in step S24), phase adjuster 56a confirms whether the flag is 1 in step S8, as with Embodiment 1. Phase adjuster 56a subtracts/adds unit adjustment Δθ from/to adjustment θ0, in accordance with a value of the flag (steps S9, S10).

In step S31 after steps S6, S7, S9, S10, phase adjuster 56a assigns THD (FVc), obtained in step S23, to THD0. Phase adjuster 56a then outputs adjustment θ0 in step S12. After step S12, the process returns to step S2.

With the process shown in FIG. 14, as with the immediately preceding process, unit adjustment Δθ is added/subtracted to/from adjustment θ0 if the total harmonic distortion rate THD (FVc) of voltage value FVc is less than the immediately preceding total harmonic distortion rate THD0. If the total harmonic distortion rate THD (FVc) of voltage value FVc is greater than the immediately preceding total harmonic distortion rate THD0, unit adjustment Δθ is added/subtracted to/from adjustment θ0 in a different manner from the immediately preceding process. This adjusts the phase of reference signal Dpole* so that the total harmonic distortion rate of voltage Vc output from power conversion device 100 is reduced.

Example Operation

Figure 15:
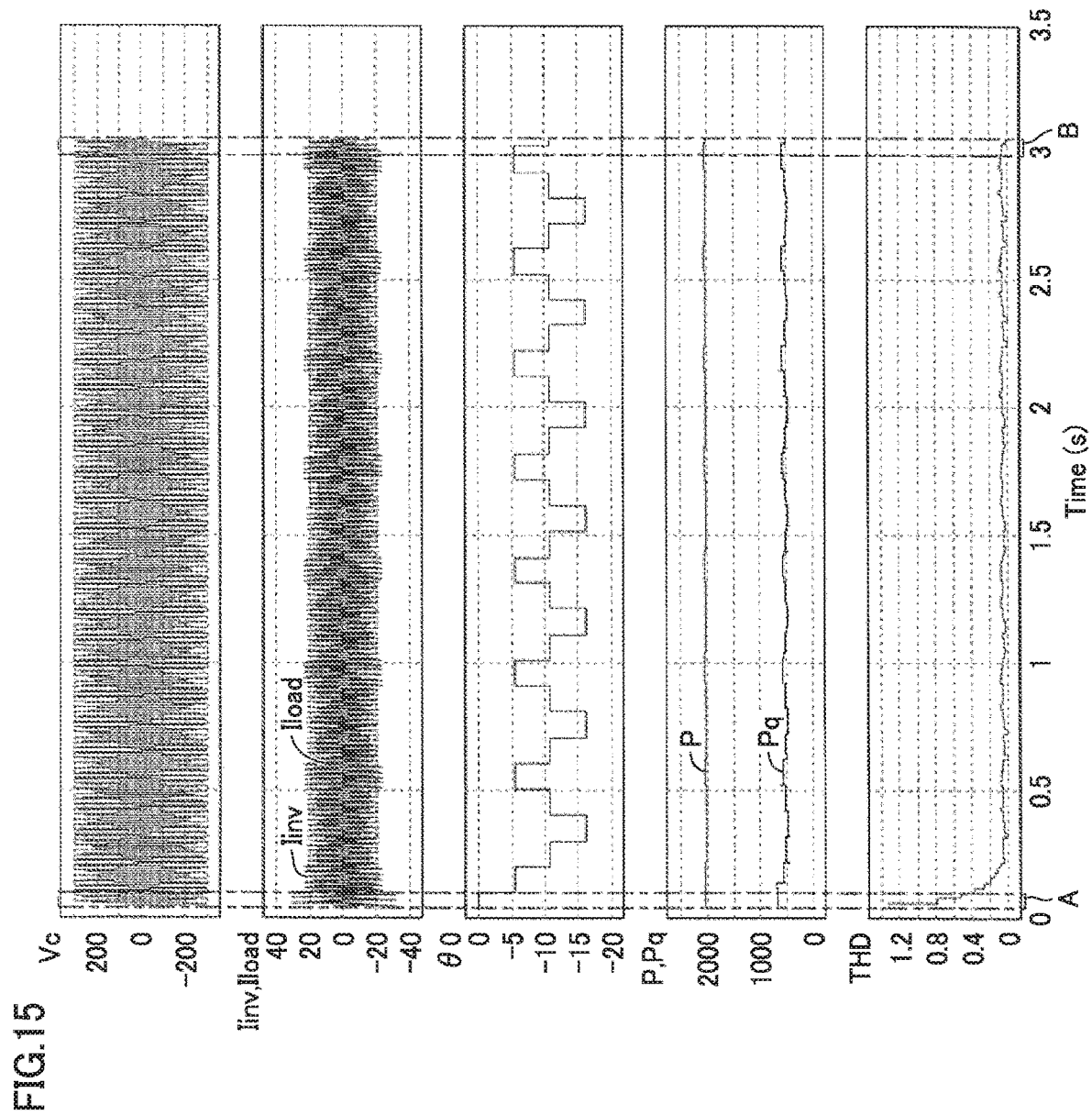
FIG. 15 is a diagram showing an example operation of the power conversion device according to Embodiment 2 when an AC load is a resistance load.
Figure 16:
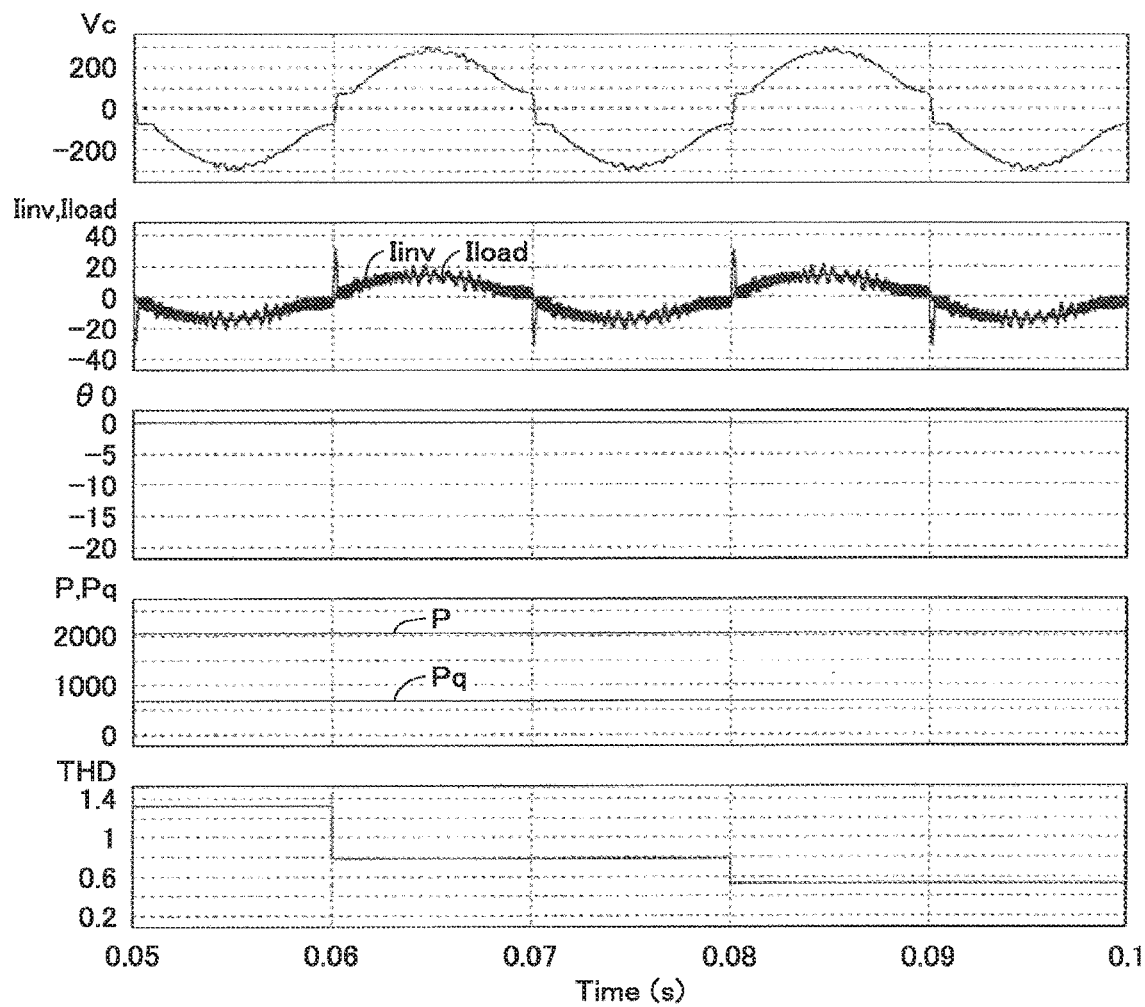
FIG. 16 is an enlarged view (of A portion) immediately after the start of the operation in FIG. 15.
Figure 17:
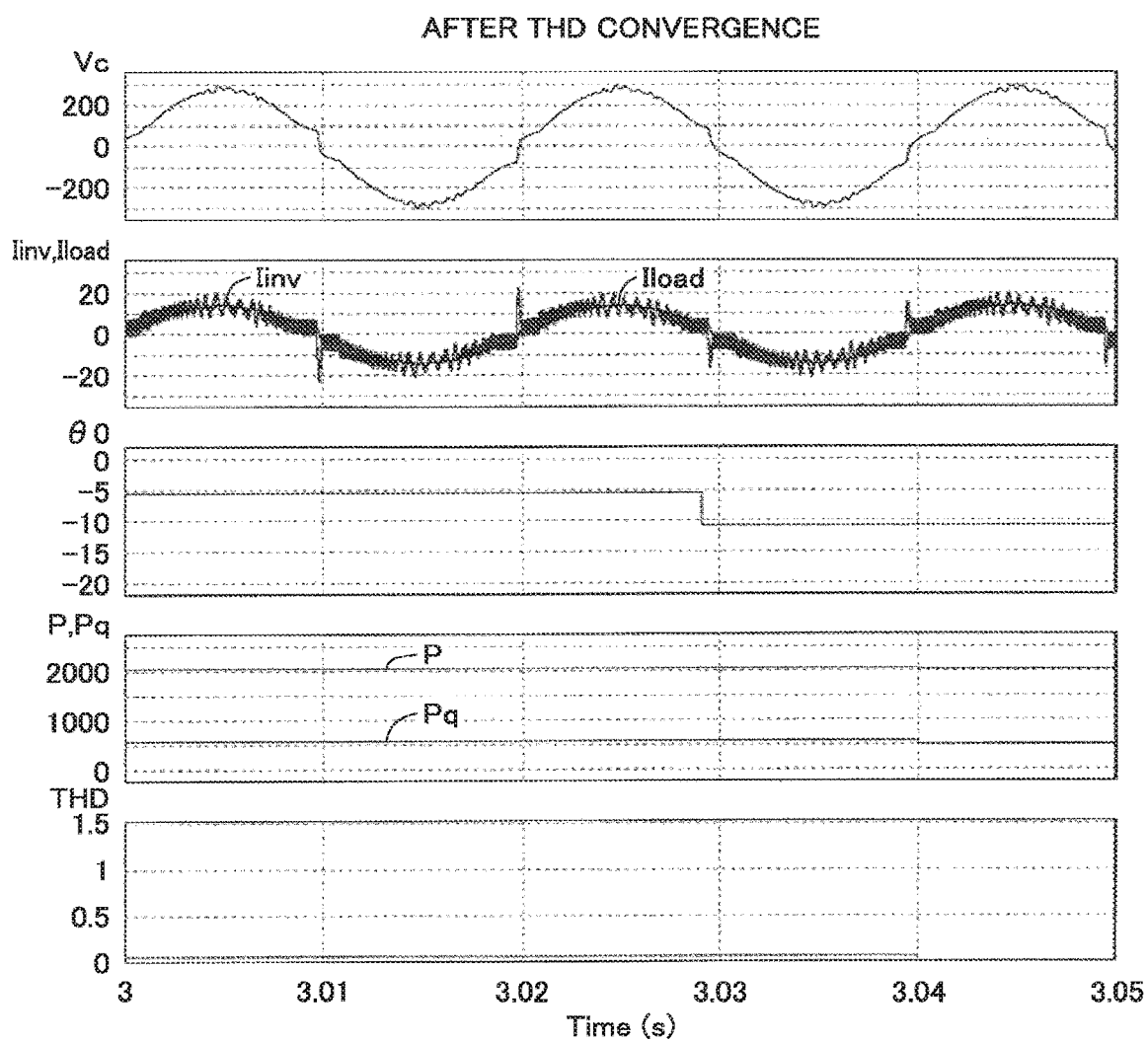
FIG. 17 is an enlarged view (of B portion) immediately before the end of the operation in FIG. 15.
Figure 18:
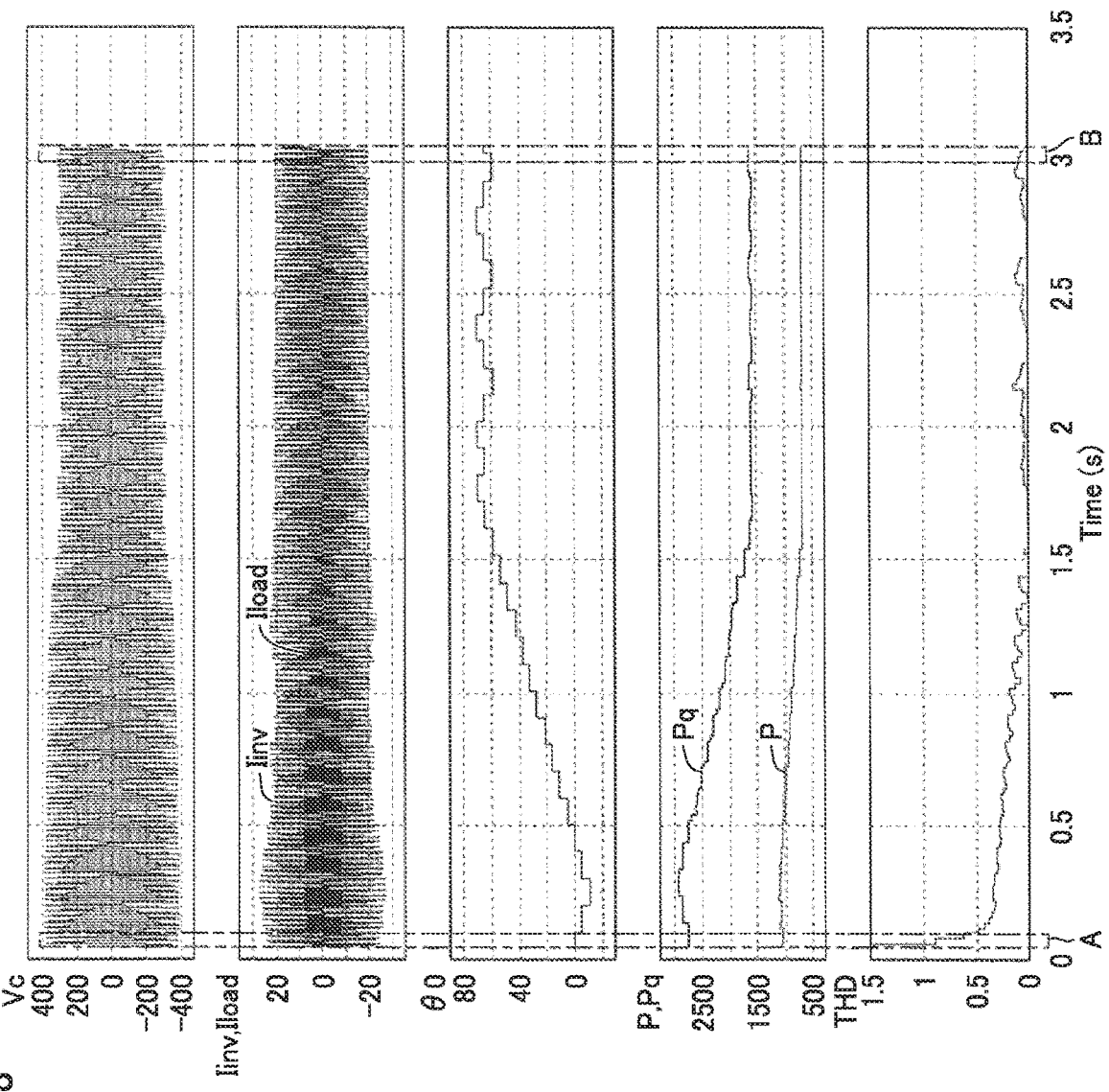
FIG. 18 is a diagram showing an example operation of the power conversion device according to Embodiment 2 when the AC load is an inductive load.
Figure 19:
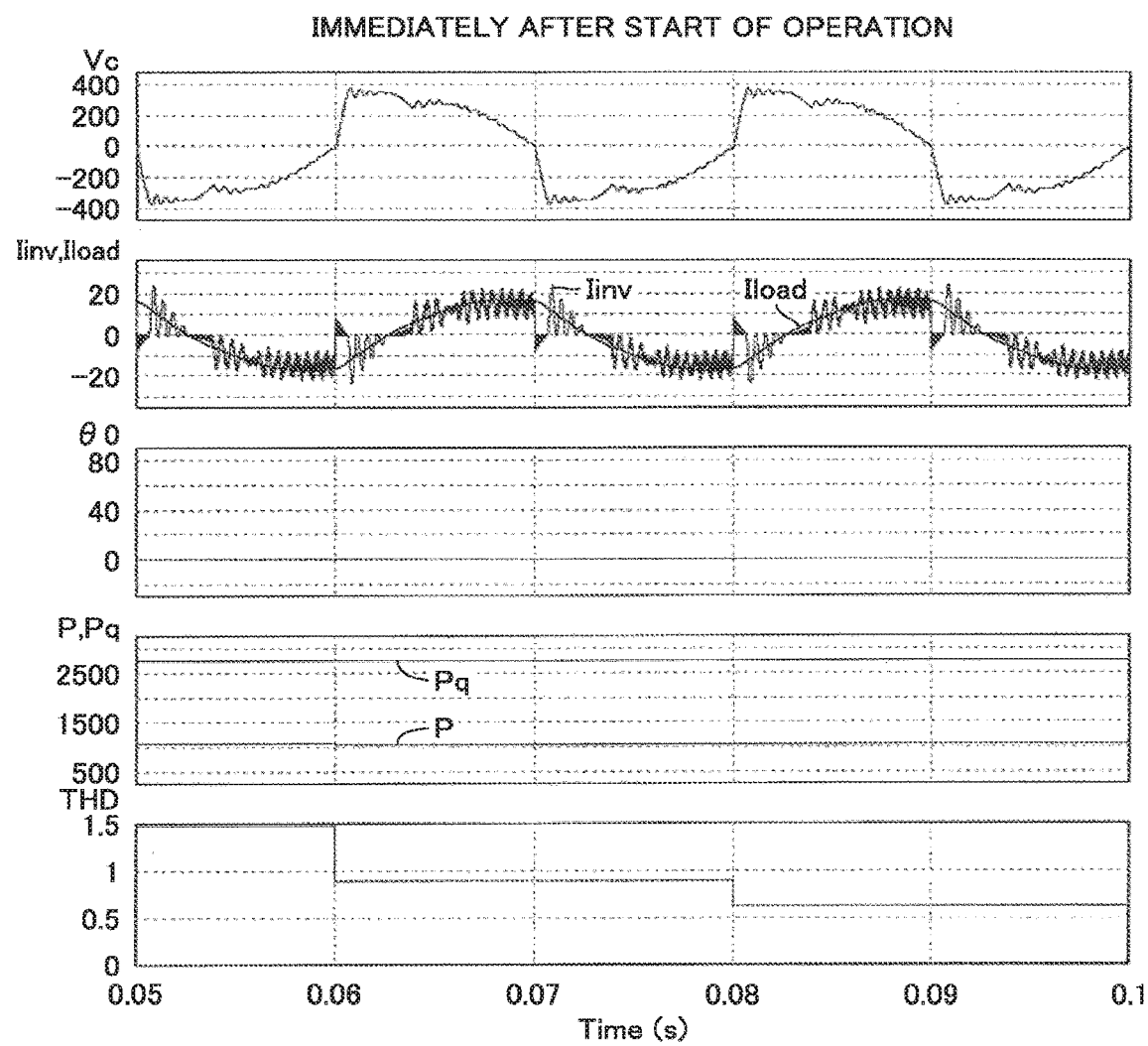
FIG. 19 is an enlarged view (of A portion) immediately after the start of the operation in FIG. 18.
Figure 20:
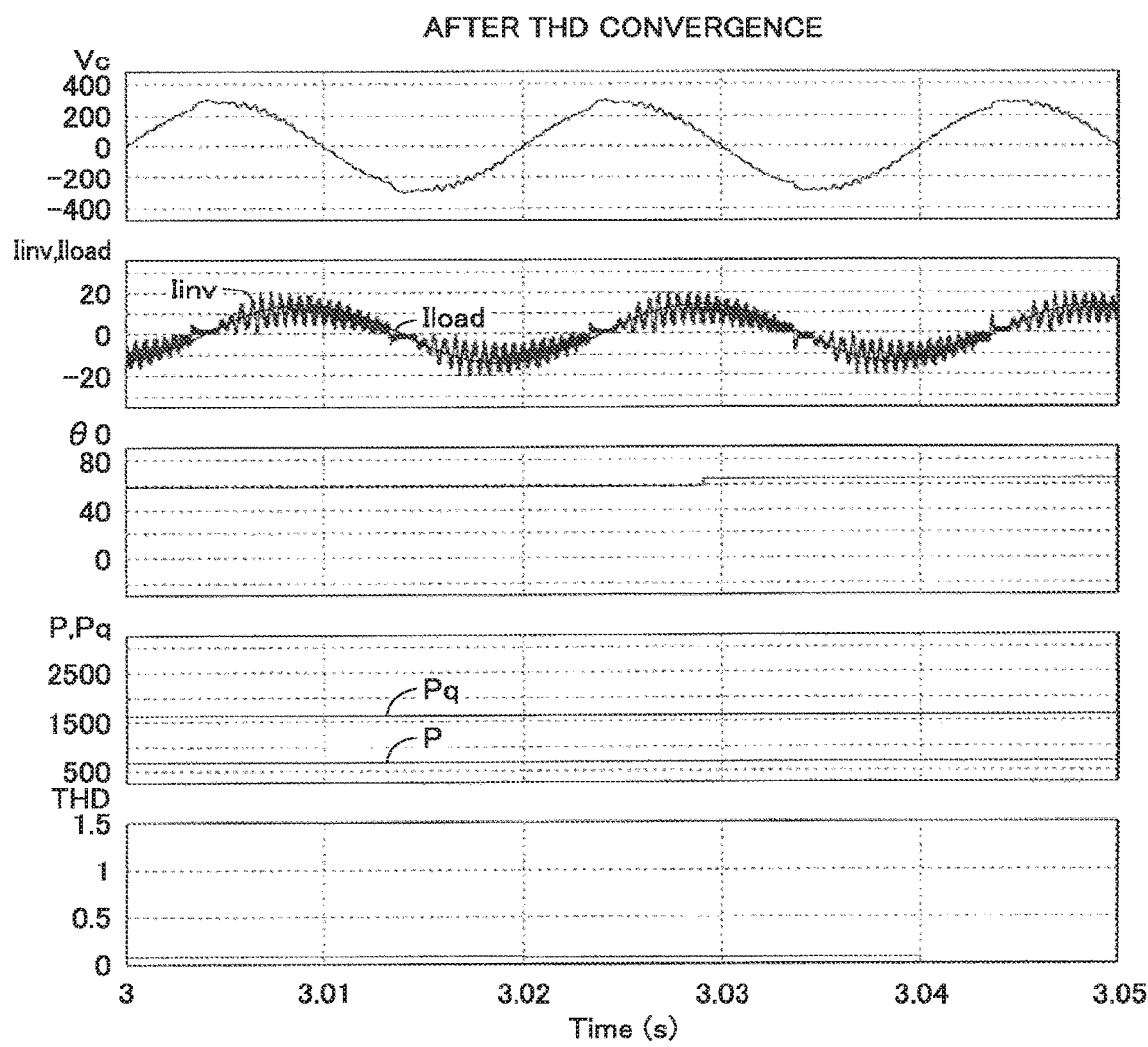
FIG. 20 is an enlarged view (of B portion) immediately before the end of the operation in FIG. 18.
Figure 21:
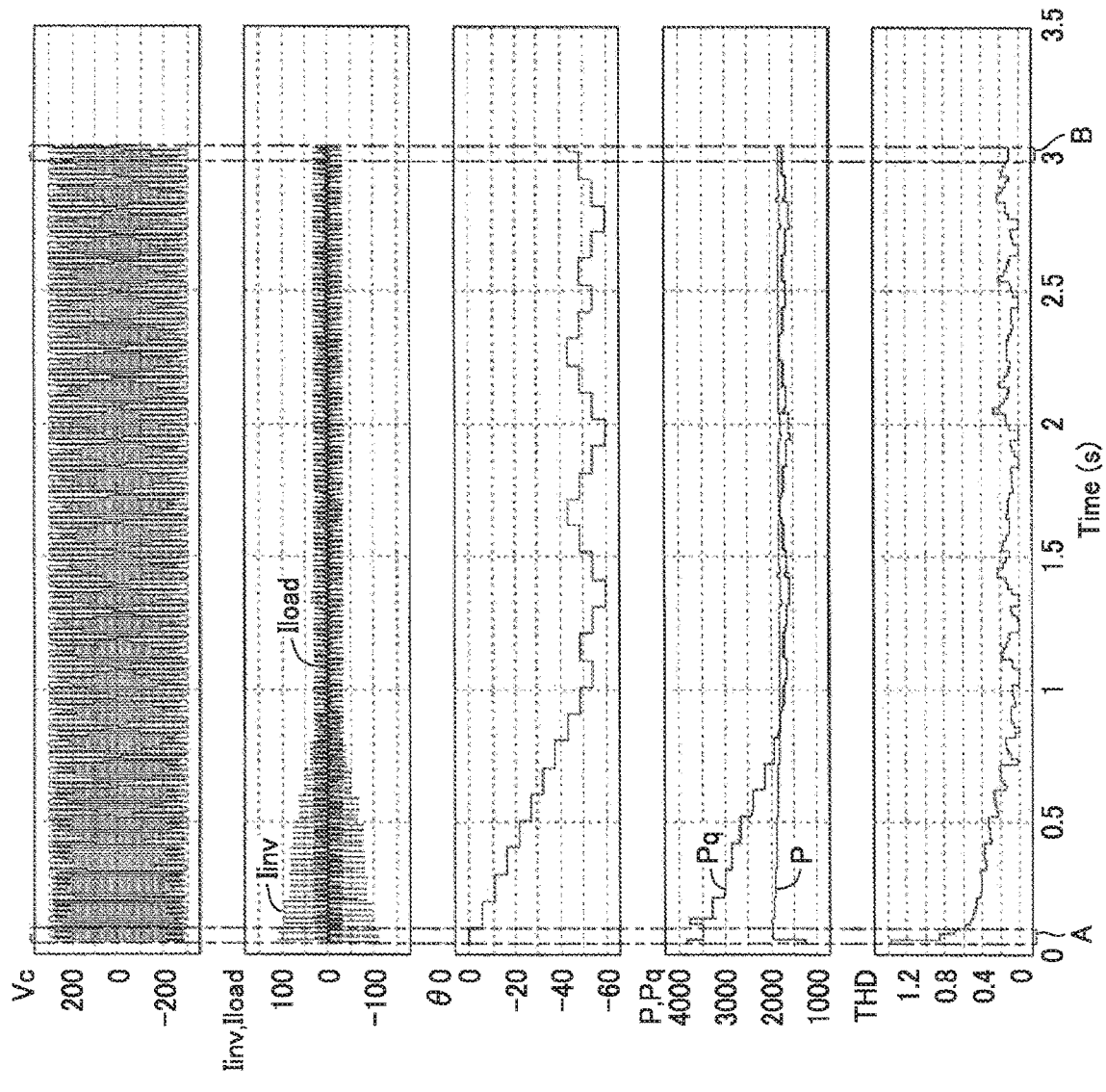
FIG. 21 is a diagram showing an example operation of the power conversion device according to Embodiment 2 when the AC load is a rectifier load.
Figure 22:
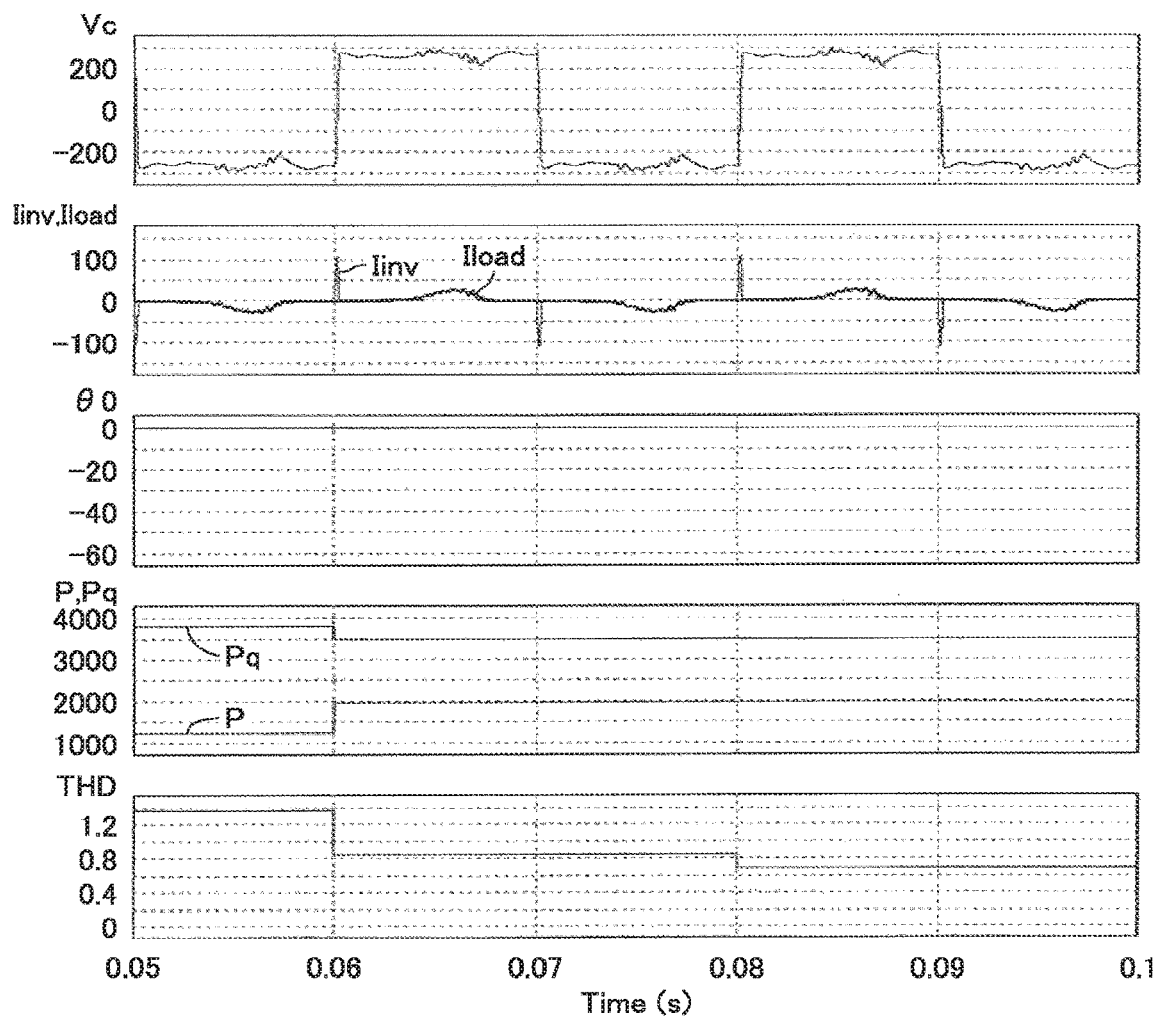
FIG. 22 is an enlarged view (of A portion) immediately after the start of the operation in FIG. 21.
Figure 23:
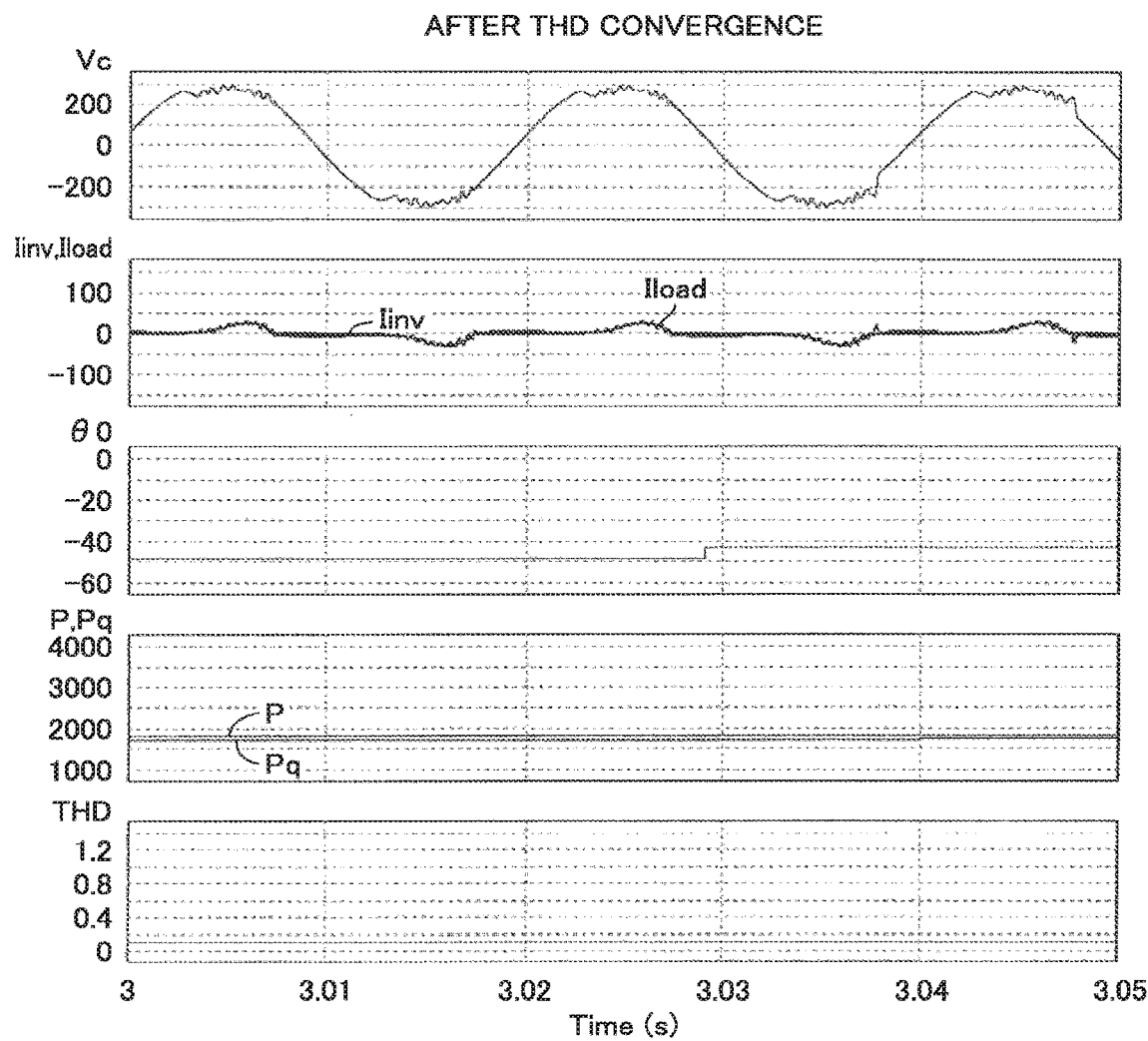
FIG. 23 is an enlarged view (of B portion) immediately before the end of the operation in FIG. 21.

FIG. 15 is an example operation of the power conversion device when AC load 8 is a resistance load. FIG. 16 is an enlarged view immediately after (A portion of FIG. 15) the start of the operation of power conversion device 100 in FIG. 15. FIG. 17 is an enlarged view immediately before (B portion of FIG. 15) the end of the operation of power conversion device 100 in FIG. 15. FIG. 18 shows an example operation of the power conversion device when AC load 8 is an inductive load. FIG. 19 is an enlarged view immediately after (A portion of FIG. 18) the start of the operation of power conversion device 100 in FIG. 18. FIG. 20 is an enlarged view immediately before (B portion of FIG. 18) the end of the operation of power conversion device 100 in FIG. 18. FIG. 21 shows an example operation of the power conversion device when AC load 8 is a rectifier load. FIG. 22 is an enlarged view immediately after (A portion of FIG. 21) the start of the operation of power conversion device 100 in FIG. 21. FIG. 23 is an enlarged view immediately before (B portion of FIG. 21) the end of the operation of power conversion device 100 in FIG. 21. In FIGS. 15 to 23, the first graph shows the waveform of voltage Vc (C voltage), the second graph shows reactor current Iinv and load current Iload, the third graph shows adjustment θ0, the fourth graph shows effective power value P and square root value Pq, and the fifth graph shows the total harmonic distortion rate for voltage Vc.

As shown in FIGS. 15 to 23, it can be seen that, compared to the start of the operation of power conversion device 100, the total harmonic distortion rate of voltage Vc gradually decreases and converges. This suggests that power conversion device 100 outputs an AC voltage that has characteristics close to the characteristics of the AC voltage supplied from the AC system.

Furthermore, one can notice that square root value Pq, corresponding to the reactive power, gradually decreases and converges, as compared to the start of the operation of power conversion device 100. This suggests that power conversion device 100 inhibits the reactive power, thereby allowing supply of stable power to AC load 8.

Furthermore, as shown in FIGS. 21 to 23, if AC load 8 is a rectifier load, a spike current, occurred at the start of the operation of power conversion device 100, is gradually inhibited.

Advantageous Effects

As described above, periodically, switching-mode changer 5a obtains the total harmonic distortion rate of voltage Vc and adjusts the phase of reference signal Dpole*. If the newly obtained total harmonic distortion rate THD (FVc) is less than the most recently obtained total harmonic distortion rate THD0, switching-mode changer 5a adjusts the phase of reference signal Dpole* in the same direction as the immediately preceding direction of adjustment. If the newly obtained total harmonic distortion rate THD (FVc) is greater than the most recently obtained total harmonic distortion rate THD0, switching-mode changer 5a adjusts the phase of reference signal Dpole* in a direction opposite the immediately preceding direction of adjustment.

According to the above configuration, as with Embodiment 1, the switching losses can be reduced, as compared to the conventional technology which switches the four arms. Furthermore, switching-mode changer 5a adjusts the phase of reference signal Dpole* so that the total harmonic distortion rate of voltage Vc is reduced. This allows power conversion device 100 to output an AC voltage that has characteristics close to the characteristics of the AC voltage supplied from the AC system. This can also inhibit the output power from becoming unstable due to the switching timing of the arms and the zero crossing timing being out of sync, thereby allowing supply of stable power to AC load 8. As such, power conversion device 100 achieves reduction in the switching losses and stabilization of output power.

Variations

In Embodiments 1, 2, PWM controller 6 generates PWM signals Sa, Sb based on output voltage command value Vc*. However, PWM controller 6 may include a current control circuit which receives the output current command value and generates conduction ratio command value D*, instead of voltage control circuit 61. In this case, PWM controller 6 generates PWM signals Sa, Sb, based on the output current command value. Switching-mode changers 5, 5a may start adjusting the phase of reference signal Dpole*, using the phase of the output current command value as the initial phase for reference signal Dpole*.

This allows the initial phase of reference signal Dpole* to be set close to the phase of the output current even if the output current cannot be observed. As a result, the phase of reference signal Dpole* can converge more quickly.

If the power conversion device receives none of the output voltage command value and the output current command value, switching-mode changers 5, 5a may determine the initial phase for reference signal Dpole* as follows. In other words, PWM controller 6 causes full-bridge circuit FB to operate in a general continuous conduction mode. Specifically, PWM controller 6 turns on and off the upper arm Q1 of first leg LG1 and lower arm Q4 of second leg LG2 synchronously, and turns on lower arm Q2 of first leg LG1 and upper arm Q3 of second leg LG2 alternately to upper arm Q1 and lower arm Q4, respectively. Switching-mode changers 5, 5a determine the initial phase for the reference signal Dpole*, based on at least one of voltage value FVc or current value FIinv at this time.

As such, the mode of operation of full-bridge circuit FB includes a continuous conduction mode, in addition to the first switching mode and the second switching mode. The continuous conduction mode is a third switching mode in which upper arm Q1 and lower arm Q2 of first leg LG1 are switched on alternately, and upper arm Q3 and lower arm Q4 of second leg LG2 are switched on alternately. Switching-mode changers 5, 5a determine the initial phase for the reference signal Dpole*, based on at least one of voltage value FVc or current value FIinv when full-bridge circuit FB is in operation in the continuous conduction mode, and start adjusting the phase of reference signal Dpole*.

Note that the initial phase of the reference signal Dpole* may be determined based on at least one of voltage value FVc or current value FIinv in the continuous conduction mode, even if the power conversion device receives at least one of the output voltage command value or the output current command value. However, the greater the amounts of changes in effective value of the output voltage command value and the output current command value as the mode of operation switches from the continuous conduction mode to the discontinuous conduction mode, the greater the error in the initial phase to the phase of the output current.

One example will be described in which the initial phase for reference signal Dpole* is determined based on current value FIinv. When full-bridge circuit FB is caused to operate while switching the mode of operation between the first switching mode and the second switching mode in accordance with reference signal Dpole*, a current having the positive polarity is output in the first switching mode, and a current having the negative polarity is output in the second switching mode. In other words, the current polarity remains the same when reference signal Dpole* is generated based only on the polarity of current value FIinv. Thus, the mode of operation does not switch between the first switching mode and the second switching mode. In contrast, a current zero crossing occurs in the third switching mode, and thus reference signal Dpole* can be generated based on current value FIinv. In other words, switching-mode changers 5, 5a determine the initial phase for the reference signal Dpole* based on current value FIinv in the third switching mode, and start adjusting the phase of reference signal Dpole*.

Next, one example will be described in which the initial phase for reference signal Dpole* is determined based on both voltage value FVc and current value FIinv. In the third switching mode, operating conditions, in which a two-level inverter—specific ripple current is maximum, can occur near the current zero crossing. Due to this, when reference signal Dpole* is generated based on only the polarity of current value FIinv, a change between the positive and negative polarities occurs several times near the current zero crossing. As a result, an error in the initial phase is great when the mode of operation of full-bridge circuit FB is switched from the third switching mode to the first switching mode or second switching mode.

These problems can be solved by making use of the polarity of voltage value FVc, the polarity of current value FIinv, and the value of current value FIinv. In order to eliminate the effects, on reference signal Dpole*, of the changes in polarity of current value FIinv due to the ripple current near the current zero crossing which occurs in the third switching mode, if reference signal Dpole* corresponds to the first switching mode, voltage value FVc is positive, and current value FIinv is positive, switching-mode changers 5, 5a generate reference signal Dpole* that corresponds to the second switching mode, as the current value FIinv decreases to a certain value or lower. If reference signal Dpole* corresponds to the second switching mode, voltage value FVc is negative, and current value FIinv is negative, switching-mode changers 5, 5a generate reference signal Dpole* that corresponds to the first switching mode, as the current value FIinv increases to a certain value or greater. Note that the same advantageous effects can be obtained by replacing conduction ratio command value D* having a DC component removed therefrom, with voltage value FVc. In other words, switching-mode changers 5, 5a determine the initial phase for the reference signal Dpole* based on voltage value FVc or at least one of conduction ratio command value D* or current value FIinv in the third switching mode, and start adjusting the phase of reference signal Dpole*.

Instead of the configurations according to Embodiments 1 and 2, in order to operate full-bridge circuit FB by switching it between the first switching mode and the second switching mode in accordance with reference signal Dpole*, (i) when voltage value FVc is positive and current value FIinv is positive in the first switching mode, switching-mode changers 5, 5a may generate reference signal Dpole* so that the mode of operation of full-bridge circuit FB is changed to the second switching mode as the current value FIinv decreases to a certain value or lower, and (ii) when voltage value FVc is negative and current value FIinv is negative in the second switching mode, switching-mode changers 5, 5a may generate reference signal Dpole* so that the mode of operation of full-bridge circuit FB is changed to the first switching mode as the current value FIinv increases to a certain value or greater. This achieves switching of full-bridge circuit FB between the first switching mode and the second switching mode, improving the output reactive power and the waveform distortion. Note that the same advantageous effects can be obtained by replacing conduction ratio command value D* having a DC component removed therefrom, with voltage value FVc. In other words, switching-mode changers 5, 5a determine the initial phase for the reference signal Dpole* based on voltage value FVc or at least one of conduction ratio command value D* or current value FIinv in the first switching mode and the second switching mode, and start adjusting the phase of reference signal Dpole*. The phase of reference signal Dpole* is repeatedly adjusted by the determination of the initial phase for the reference signal Dpole*.

In the above description, phase adjusters 56, 56a adjust the phase of reference signal Dpole* for each period T of an alternating-current indicated by output voltage command value Vc*. However, phase adjusters 56, 56a may adjust the phase of reference signal Dpole* every constant multiple of period T.

In Embodiment 1 above, phase adjuster 56 included in switching-mode changer 5 may obtain, for each period T, another parameter value that correlates with the reactive power, instead of square root value Pq. As another parameter value, phase adjuster 56 may obtain, for example, a ratio (=P/Pq) of effective power value P and square root value Pq. The ratio P/Pq is a parameter value which decreases with an increase of the reactive power. In this case, if the value of the newly obtained ratio P/Pq is greater than the value of the most recently obtained ratio P/Pq, phase adjuster 56 adds/subtracts unit adjustment $\Delta\theta$ to/from adjustment $\theta 0$ as with the immediately preceding process. In other words, switching-mode changer 5 adjusts the phase of reference signal Dpole* in the same direction as the immediately preceding direction of adjustment. In contrast, if the value of the newly obtained ratio P/Pq is less than the value of the most recently obtained ratio P/Pq, phase adjuster 56 adds/subtracts unit adjustment Δθ to/from adjustment θ0 in a manner different from the immediately preceding process. In other words, switching-mode changer 5 adjusts the phase of reference signal Dpole* in a direction opposite the immediately preceding direction of adjustment. This allows power conversion device 100 to yield a reduced reactive power, while inhibiting the reduction of effective power.

In the above description, switching-mode changers 5, 5a each output reference signal Dpole* indicating 0 or 1. However, reference signal Dpole* may be any signal that indicates one of different two values. For example, reference signal Dpole* may by any signal that indicates 1 or −1. In this case, switching-mode changers 5, 5a may generate reference signal Dpole*, in accordance with Equation (3) below:

$$Dpole^*=(\sin(\omega t+\theta 0)/|\sin(\omega t+\theta 0)|) \quad \text{Equation (3)}$$

When reference signal Dpole* is 1, PWM controller 6 generates PWM signal Sb having a value 0. When reference signal Dpole* is −1, PWM controller 6 generates PWM signal Sa having a value 0.

The presently disclosed embodiments should be considered as illustrative in all aspects and do not limit the present disclosure. The scope of the present disclosure is defined by the appended claims, rather than by the above description of the embodiments. All changes which come within the meaning and range of equivalency of the appended claims are intended to be embraced within their scope.

REFERENCE SIGNS LIST 1 inverter; 2 LC filter; 3, 4 low-pass filter; 5, 5a switching-mode changer; 6 PWM controller; 7 DC power supply; 8 AC load; 11 current sensor; 21 voltage sensor; 51a to 51d, 63, 64 multiplier; 52 mean value operator; 53a, 53b effective value operator; 54 subtractor; 55 square root operator; 56, 56a phase adjuster; 57 signal generator; 58 distortion rate meter; 61 voltage control circuit; comparator; 100 power conversion device; C capacitor; D1 to D4 freewheel diode; FB full-bridge circuit; L reactor; LG1 first leg; LG2 second leg; N1 first connection point; N2 second connection point; P1 first terminal; P2 second terminal; P3 third terminal; P4 fourth terminal; Q1, Q3 upper arm; Q2, Q4 lower arm.

The invention claimed is:

1. A power conversion device for converting a direct-current (DC) voltage from a DC power supply into an alternating-current (AC) voltage, the power conversion device, comprising:
a first terminal and a second terminal which are respectively connected to a positive electrode and a negative electrode of the DC power supply;
a third terminal and a fourth terminal which output the AC voltage;
a full-bridge circuit which includes a first leg and a second leg connected in parallel between the first terminal and the second terminal;
a reactor connected between the third terminal and a first connection point connecting an upper arm and a lower arm of the first leg;
a switching-mode changer that generates a signal for switching a mode of operation of the full-bridge circuit to a first switching mode or a second switching mode; and a PWM controller which causes the full-bridge circuit to operate in the first switching mode or the second switching mode, in accordance with the signal, wherein
the fourth terminal is connected to a second connection point connecting an upper arm and a lower arm of the second leg,
in the first switching mode, the upper arm of the first leg and the lower arm of the second leg are switched synchronously, and the lower arm of the first leg and the upper arm of the second leg are non-conducting,
in the second switching mode, the lower arm of the first leg and the upper arm of the second leg are switched synchronously, and the upper arm of the first leg and the lower arm of the second leg are non-conducting, and
the switching-mode changer adjusts a phase of the signal so that reactive power output from the third terminal and the fourth terminal or a distortion rate of the AC voltage is reduced.

2. The power conversion device according to claim 1, wherein
periodically, the switching-mode changer obtains a parameter value that correlates with the reactive power and adjusts the phase of the signal,
the parameter value is calculated, using an effective power value output from the third terminal and the fourth terminal, an effective value of the AC voltage, and an effective value of a current flow through the reactor,
when the parameter value increases with an increase of the reactive power:
if a newly obtained parameter value is less than a most recently obtained parameter value, the switching-mode changer adjusts the phase of the signal in a same direction as an immediately preceding direction of adjustment; and
if the newly obtained parameter value is greater than the most recently obtained parameter value, the switching-mode changer adjusts the phase of the signal in a direction opposite the immediately preceding direction of adjustment, and
when the parameter value decreases with an increase of the reactive power:
if the newly obtained parameter value is greater than the most recently obtained parameter value, the switching-mode changer adjusts the phase of the signal in the same direction as the immediately preceding direction of adjustment; and
if the newly obtained parameter value is less than the most recently obtained parameter value, the switching-mode changer adjusts the phase of the signal in the direction opposite the immediately preceding direction of adjustment.

3. The power conversion device according to claim 1, wherein
periodically, the switching-mode changer obtains the distortion rate of the AC voltage and adjusts the phase of the signal,
if a newly obtained distortion rate is less than a most recently obtained distortion rate, the switching-mode changer adjusts the phase of the signal in the same direction as the immediately preceding direction of adjustment, and
if the newly obtained distortion rate is greater than the most recently obtained distortion rate, the switching-mode changer adjusts the phase of the signal in a direction opposite an immediately preceding direction of adjustment.

4. The power conversion device according to claim 1, wherein
   the PWM controller controls operation of the full-bridge circuit, based on an output current command, and
   the switching-mode changer starts adjusting the phase of the signal, using a phase of the output current command as an initial phase for the signal.

5. The power conversion device according to claim 1, wherein
   the PWM controller controls operation of the full-bridge circuit, based on an output voltage command,
   the switching-mode changer starts adjusting the phase of the signal, using a phase of the output voltage command as an initial phase for the signal.

6. The power conversion device according to claim 1, wherein
   the mode of operation of the full-bridge circuit includes a third switching mode, in addition to the first switching mode and the second switching mode,
   in the third switching mode,
       the upper arm of the first leg and the lower arm of the first leg are switched on alternately, and the upper arm of the second leg and the lower arm of the second leg are switched on alternately,
   the PWM controller modulates a pulse width in accordance with a result of comparison of a triangular wave with a command value, and
   the switching-mode changer determines an initial phase for the signal, based on the AC voltage or at least one of the command value or a current flow through the reactor when the full-bridge circuit is in operation in the third switching mode, and starts adjusting the phase of the signal.

7. The power conversion device according to claim 1, wherein
   the PWM controller modulates a pulse width in accordance with a result of comparison of a triangular wave with a command value, and
   the switching-mode changer determines an initial phase for the signal, based on the AC voltage or at least one of the command value or a current flow through the reactor, and starts adjusting the phase of the signal.

* * * * *